US009996973B2

(12) United States Patent
Shuster et al.

(10) Patent No.: US 9,996,973 B2
(45) Date of Patent: Jun. 12, 2018

(54) AUGMENTED REALITY OBJECTS BASED ON BIOMETRIC FEEDBACK

(71) Applicant: Empire Technology Development LLC, Wilmington, DE (US)

(72) Inventors: Brian Mark Shuster, Vancouver (CA); Gary Stephen Shuster, Fresno, CA (US)

(73) Assignee: EMPIRE TECHNOLOGY DEVELOPMENT LLC, Wilmington, DE (US)

( * ) Notice: Subject to any disclaimer, the term of this patent is extended or adjusted under 35 U.S.C. 154(b) by 81 days.

(21) Appl. No.: 14/430,203

(22) PCT Filed: Jul. 25, 2014

(86) PCT No.: PCT/US2014/048133
§ 371 (c)(1),
(2) Date: Mar. 20, 2015

(87) PCT Pub. No.: WO2015/080773
PCT Pub. Date: Jun. 4, 2015

(65) Prior Publication Data
US 2016/0035132 A1 Feb. 4, 2016

Related U.S. Application Data

(60) Provisional application No. 61/910,327, filed on Nov. 30, 2013.

(51) Int. Cl.
*G06T 19/00* (2011.01)
*G06F 3/147* (2006.01)
(Continued)

(52) U.S. Cl.
CPC ............ *G06T 19/006* (2013.01); *G06F 3/147* (2013.01); *G09G 5/026* (2013.01); *G06K 9/00671* (2013.01)

(58) Field of Classification Search
None
See application file for complete search history.

(56) References Cited

U.S. PATENT DOCUMENTS

2004/0113885 A1  6/2004  Gene et al.
2005/0062738 A1  3/2005  Handley et al.
(Continued)

OTHER PUBLICATIONS

Damala, Areti, and Nenad Stojanovic. "Tailoring the Adaptive Augmented Reality (A 2 R) museum visit: Identifying Cultural Heritage professionals' motivations and needs." 2012 IEEE International Symposium on Mixed and Augmented Reality-Arts, Media, and Humanities (ISMAR-AMH). IEEE, 2012.*
(Continued)

*Primary Examiner* — Ryan D McCulley

(57) ABSTRACT

Technologies are generally described for refining virtual objects output within an augmented reality environment. In one example, a method includes determining, by a system comprising a processor, first response data representative of a first response to a first set of object data associated with a simulation of an interaction between a first virtual object and a second virtual object. The method also includes modifying at least one object of the first set of object data to create a second set of object data associated with another simulation of the interaction between the first virtual object and the second virtual object. Further, the method includes outputting data representative of the first virtual object, the second virtual object, and the second set of object data.

23 Claims, 12 Drawing Sheets

(51) Int. Cl.
*G09G 5/02* (2006.01)
*G06K 9/00* (2006.01)

(56) References Cited

U.S. PATENT DOCUMENTS

| | | |
|---|---|---|
| 2009/0150802 A1 | 6/2009 | Do et al. |
| 2010/0013761 A1* | 1/2010 | Birnbaum .............. G06F 1/1613 345/156 |
| 2010/0306647 A1 | 12/2010 | Zhang et al. |
| 2011/0035802 A1 | 2/2011 | Arajujo, Jr. et al. |
| 2012/0113223 A1 | 5/2012 | Hilliges et al. |
| 2012/0327119 A1 | 12/2012 | Woo et al. |
| 2013/0117377 A1 | 5/2013 | Miller |
| 2013/0286004 A1* | 10/2013 | McCulloch ........... G06T 19/006 345/419 |
| 2013/0293577 A1 | 11/2013 | Perez et al. |
| 2014/0098126 A1* | 4/2014 | Fein ........................ G06T 11/00 345/633 |
| 2014/0098137 A1* | 4/2014 | Fein ........................ G06F 3/048 345/633 |
| 2014/0287806 A1* | 9/2014 | Balachandreswaran A63F 13/00 463/7 |

OTHER PUBLICATIONS

Damala, Areti, et al. "Exploring the affective museum visiting experience: adaptive augmented reality (A2R) and cultural Heritage." International Journal of Heritage in the Digital Era 2.1 (2013): 117-142.*

Champion, Erik, and Andrew Dekker. "Biofeedback and virtual environments." International Journal of Architectural Computing 9.4 (2011): 377-395.*

Bianchi, G., et al. "High-fidelity visuo-haptic interaction with virtual objects in multi-modal AR systems," ISMAR '06 Proceedings of the 5th IEEE and ACM International Symposium on Mixed and Augmented Reality, Oct. 22-25, 2006, 10 pages.

International Search Report and Written Opinion for PCT/US2014/048133 dated Nov. 25, 2014, 12 pages.

Kuchenbecker, K. J. et al. "Improving Contact Realism Through Event-Based Haptic Feedback," IEEE Transactions on Visualization and Computer Graphics, vol. 12, Issue 2, Mar. 2006, 13 pages.

* cited by examiner

AUGMENTED REALITY OBJECTS BASED ON BIOMETRIC FEEDBACK

CROSS-REFERENCE TO RELATED APPLICATIONS

This application is a U.S. national stage application under 35 U.S.C. § 371 of, and claims priority to each of, International Application No. PCT/US2014/048133, filed on Jul. 25, 2014, and entitled "AUGMENTED REALITY OBJECTS BASED ON BIOMETRIC FEEDBACK," which claims priority to U.S. Provisional Application No. 61/910,327, filed on Nov. 30, 2013, and entitled "Biometric Crowd Source Virtual Environment Enhancements," the entireties of each of which applications are expressly incorporated herein by reference.

TECHNICAL FIELD

The subject disclosure relates generally to augmented reality objects and, also generally, to augmented reality objects based on biometric feedback.

BACKGROUND

With advancements in computing technology and prevalence of computing devices, usage of computers for daily activities has become commonplace. Virtual interactions that occur within a computing environment, such as an augmented reality experience, have also become common and users expect such interactions to simulate real-world experiences. Users of computing devices generally know how things (e.g., objects, trees, water, and so forth) are supposed to feel, sound, smell, and look. For example, if a user runs his hands over a marble surface and finds the surface soft, the user knows that something is not correct. In another example, if a glass of water is knocked over, the user expects the water to flow downward, toward the ground. If a virtual experience simulates the water flowing upward, toward the ceiling or the sky, the user knows this is incorrect. When the virtual interactions are not what is expected, it results in a negative user experience.

However, many experiences simulated in a virtual computing environment are not as simplistic as a feel of a marble surface or a flow of water. Further, since augmented reality systems may include a broad range of possible simulated environments and elements, and due to the broad range of users, it may be difficult to anticipate every experience a user will have. Thus, a system that is capable of emulating arbitrary environments cannot be programmed in advance for all such environments.

SUMMARY

In one embodiment, a method may include determining, by a system comprising a processor, first response data representative of a first response to a first set of object data associated with a simulation of an interaction between a first virtual object and a second virtual object. The first response data may comprise an indication that the interaction does not match an expected interaction and is received in response to an output of the first virtual object, the second virtual object, and the first set of object data. The method may also include modifying at least one object of the first set of object data to create a second set of object data associated with another simulation of the interaction between the first virtual object and the second virtual object. In addition, the method may include outputting data representative of the first virtual object, the second virtual object, and the second set of object data.

According to another embodiment, a system may include a memory storing computer-executable components and a processor, coupled to the memory, operable to execute or facilitate execution of one or more of the computer-executable components. The computer-executable components may include a virtual object manager configured to determine at least one representation of at least one virtual object of a set of virtual objects. The at least one representation may be based on a set of information that comprises one or more of object type data, object material composition data, object textual data, object temperature data, object visual data, object weight data, object size data, object physics data, or object interaction data. The computer-executable components may also include an analysis monitor configured to detect a response to an output of the at least one representation of the at least one virtual object. The response may comprise an indication that the at least one representation of the at least one virtual object is an unexpected representation. Further, the computer-executable components may include an adjustment manager configured to modify at least a portion of the set of information based on the response and create at least a second representation of the at least one virtual object.

According to another embodiment, provided is a computer-readable storage device comprising executable instructions that, in response to execution, cause a system comprising a processor to perform operations. The operations may include determining a first representation of a first virtual object of a set of virtual objects. The first representation may be based on a set of information that comprises one or more of object type data, object material composition data, object textual data, object temperature data, object visual data, object weight data, object size data, object physics data, or object interaction data. The operations may also include analyzing a response to an output of the first representation of the first virtual object. The response may comprise an indication that the first representation of the first virtual object is an incorrect representation, and the response is received from a participant. Further, the operations may include modifying at least a subset of the set of information based on the response to create a second representation of the first virtual object. The operations may also include analyzing another response to another output of the second representation of the first virtual object. The other response may comprise another indication that the second representation is a correct representation or is still the incorrect representation.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE FIGURES

The foregoing and other features of this disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings in which:

DETAILED DESCRIPTION

Overview

Figure 1:
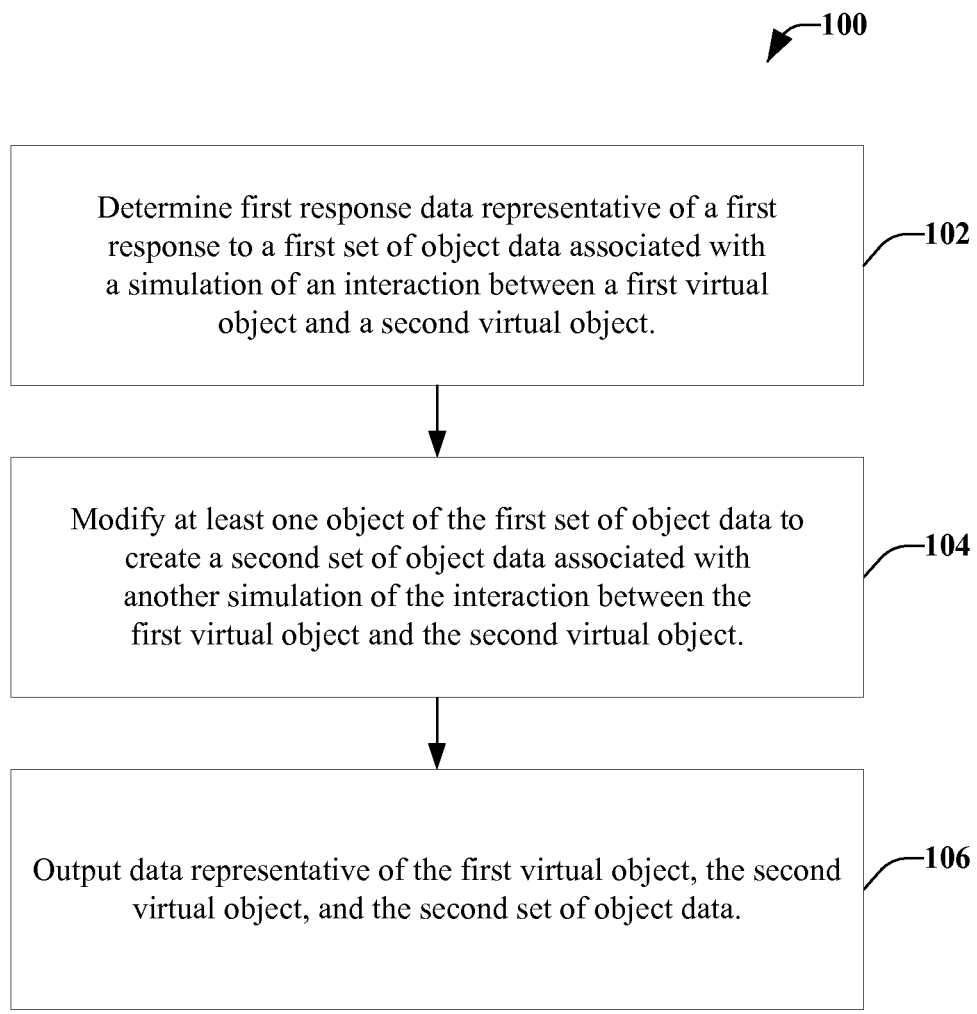
FIG. 1 illustrates an example, non-limiting embodiment of a method for creation and modification of augmented reality objects based on biometric feedback.

In the following detailed description, reference is made to the accompanying drawings, which form a part hereof. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the disclosure, as generally described herein, and illustrated in the Figures, may be arranged, substituted, combined, separated, and designed in a wide variety of different configurations, all of which are explicitly contemplated herein.

As provided herein, various aspects relate to refining augmented reality objects based on biometric feedback from one or more users. For example, an object may be output by itself, or in combination with one or more other objects, or a user might interact with a virtual object. At about the same time (or at a different time) as the object is being output to a user (or the user interacts with the object), biometric data of the user may be collected and analyzed to determine the effect the object, or multiple objects, has on the user. If the biometric response is positive, modification of the object or one or more other objects might not need needed. However, if the biometric response is determined to be negative, modification of the object, one or more of the other objects, or both, might be made and one or more additional biometric responses might be solicited from a same user or a different user.

As mentioned above, it may be desirable that augmented reality experiences match the expectations of users. In some instances, a user expects the augmented reality experience to match real-world experiences. In other instances, a user desires the augmented reality experience to be different from the real-world. For example, if a user walks through a virtual version of downtown Las Vegas in July, in most cases the user would not want the simulation to make her feel as if is it 110 degrees Fahrenheit, even if it detracts from the verisimilitude of the experience. In another example, surgeons performing remote robotic microsurgery would want force feedback that exceeds the feedback they would receive using unaided hands and eyes. In an aspect, a consistency of user experience should be obtained in these types of applications.

However, using the above Las Vegas example, a user that touches a virtual car handle would not want to get burned by the heat of the handle, which would happen in the real-world. Thus, there may be a temperature that would seem real enough to not detract from the augmented reality experience. To determine this temperature, various aspects described herein may be used. For example, biofeedback that indicates a state of pain or alarm may be additionally used to modify a simulation. In another aspect, general data about pain and discomfort thresholds may be utilized to establish general or universal limitations on stimuli presented to a user. According to another aspect, past experience with a user's biofeedback may be utilized to generate a set of rules specific to that user. For example, if the user touched a 75 degree Celsius surface and experienced pain, the system may set a limit on temperature at 74 degrees Celsius for that user, even if most other users would not experience pain before 80 degrees Celsius.

With continuing reference to the Las Vegas example, the user touches the door handle and a heating element in a force feedback glove in an augmented reality environment (e.g., through the use of auxiliary devices) may generate a temperature that is accurate, and thus capable of burning a user or causing discomfort. In this case, the biofeedback may be used to immediately, or substantially immediately, turn down the heat. To discern what is the source of the discomfort, the system may look at the amount of deviation of each simulated environmental element from a baseline and dial back environmental elements that are furthest from baseline, repeating the process until the biofeedback returns to a normal stage.

Accordingly, in one aspect, embodiments herein may more readily associate correct textual data and/or interaction data with new or unknown objects. In the past, such association has relied on large amounts of manual data collection, which is time consuming, impractical and expensive.

Furthermore, manual data collection is somewhere between impossible and impractical to use as a means for improving the realism of augmented reality environments in situations where the subjective limitations and expectations of users differ. For example, consider the noise an object makes when dropped. A user with hearing damage may find a louder sound to be more realistic (based on expectations developed prior to hearing loss). Another user, who normally uses a hearing aid, may require an even louder sound when the hearing aid is not installed. Still another user with sensitivity to noise may desire a quieter sound since a sound that is too loud may be startling or uncomfortable. Thus, the various aspects discussed herein may scale, even down to perfecting the illusion of realism, based on the subjective needs of the individual user.

In accordance with various aspects, an artificial synesthesia may be utilized. In some situations, the available virtual reality equipment may be incapable of generating a sufficiently accurate emulation of a desired sensory input. In another situation, the user may prefer to receive sensory input in manner that is different from the real world sensation being emulated. In still another situation, the user may wish to experience sensory input intended for one sensory system through interaction with a different sensory system. Other situations may also exist and may be implemented through the various aspects discussed herein.

Returning to the Las Vegas example, a force feedback device may not be equipped with heating coils. Alternatively, a user may not desire that temperature be emulated, such as where a user has an unusually high or low sensitivity to temperature. In such a situation, instead of temperature, or in addition to temperature, sensory input to a different sense system (or a different part of the same system) may be utilized to indicate temperature. For example, a hot door handle may generate a vibration in a force feedback glove, may generate a flash of red light (or a light of another color) in an immersive viewing device, may generate a warning tone, and/or may generate a burning smell. In an aspect, users with natural synesthesia may be presented with sensory input through a sensory system in order to more accurately trigger a desired sensory perception. For example, a user who sees red when hearing a bell ring may be presented with a ringing bell when the system desires that the user perceive red.

In accordance with some aspects, related components of the sensory elements in an environment may be changed in order to keep all (or substantially all) of the inputs within a safe, desirable, and/or effective range. Consider the Las Vegas example. If the ambient temperature is 45 degrees Celsius and the car door handle is 85 degrees Celsius, there is a 40 degree difference between the ambient temperature and the door handle temperature. However, the system may refuse to emulate the true door temperature because, in this example, it exceeds the user's pain threshold. Thus, according to an implementation, the system might not emulate a temperature greater than 75 degrees Celsius. However, recognizing there are environmental elements greater than 75 degrees Celsius with a likelihood of being interacted with, the system may reduce the ambient temperature by 10 degrees in order to allow the user to more accurately experience the temperature differential without exceeding safety or pain thresholds. According to an implementation, the ambient temperature may be reduced in degrees or gradually so as to make the reduction less noticeable to the user. Thus, if the system emulated an ambient temperature of 35 degrees Celsius, 10 degrees below the actual ambient temperature, an emulated car door temperature of 75 degrees Celsius would reflect the actual 40 degree difference between the ambient temperature and the car door temperature even though both temperatures would be divergent from the actual temperatures of the environment the system is emulating. According to some aspects, elements and environments where maintaining the relative difference between sensory inputs is more desirable than maintaining the objective accuracy of the sensory inputs may be identified manually, with reference to a database, by heuristics, or by a combination thereof.

In some aspects, pain, discomfort, and/or verisimilitude may be utilized to set upper bounds and/or lower bounds for elements of the experience, which may be temperature, for example. In some implementations, such as where maintaining a difference of 40 degrees from the high temperature may result in exceeding a lower temperature bound, the difference may be reduced in order to avoid exceeding the bounds. Using temperature as an example, in a case where there are, or may be, elements that are higher or lower than the temperature of the object that is being interacted with, the amount of difference maintained may be decreased so that there is room between the object temperature and the high or low bound. In this way, the additional object or objects may be presented to the user at a temperature that is closer to the bound than the object that is being interacted with.

In order to provide a user with a realistic augmented reality experience, tactile user interfaces for augmented reality often endeavor to provide the user with sensory data that accurately (or as accurately as possible) matches an object with which the user is interacting. In some implementations, such as for use during microsurgery or similar applications, it might be desirable to modify the accuracy of the sensory data while retaining the sensory data within bounds that the user might expect. In these applications, the desired amount of deviation may be determined using biofeedback, as will be described more fully herein.

The object texture is a component of human sensory processing. Conventional technology does not provide a robust, accurate, and viable means for determining and recording the texture information of virtual objects. Thus, conventional technology is insufficient to present an end user with accurate texture information for those objects. Visual data alone is insufficient to determine the texture of a virtual object.

Further, there might be some implementations where one or more objects are entirely fabricated, such as in an augmented reality environment that is based on a user's fanciful design rather than a real world item. In this situation, the user may have an expectation of what the texture of a tabletop, for example, may be, however, there might be no real world reference point. Therefore, using various aspects discussed herein, it is possible to determine what the user(s) expect the texture or other characteristics should be (and/or one or more candidate textures or other characteristics within a plurality of such textures or other characteristics that may meet user expectations) for entirely arbitrary, non-reality based objects. Consider, for example, a pet that is a cross between a lizard and a dog. Users would have an expectation of what the skin might feel like, and without determining this through biometric feedback, it may be impossible to programmatically determine what users would expect a "normal" tactile profile for such a pet to feel like.

This texture data may be important when users of an augmented reality system interact with virtual objects in an auditory or tactile manner. For example, this may occur when a user touches or otherwise interacts with a virtual object using haptics and/or force feedback augmented reality devices. This deficiency precludes a seamless and realistic augmented reality experience. Further, conventional texture processing technology has focused on 3D rendering problems, but has not considered audio and tactile issues.

For example, imagine a sound that is generated by the interaction between virtual objects, such as the sound of scratching skin as compared to the sound of hairs rubbing against each other. For the skin, the sound would depend on the object doing the scratching. For the hair, there should be no sound (or virtually no sound). A system focused on the problems of bumpable surfaces, accurate rendering of hair physics, and so on, may include a lot of data that might be needed to determine the parameters of sound (e.g., the number of hairs hitting each other). However, the determination as to the nature (or even the existence) of a sound based on those parameters is something that may be achieved through the utilization of biometric feedback, as discussed herein.

In addition, the accuracy and utility of augmented or virtual reality environments necessitate that objects interact in a way that corresponds to a similar interaction in the real world. Texture information and material composition of virtual objects cannot be obtained by an augmented reality system by visual data only. However, this information is necessary for the system to be able to provide a realistic and accurate outcome for multiple-object interactions.

For augmented reality environments intended for use by humans, credibility is achieved when objects behave in a manner that the users find consistent with their real word experience. For augmented reality environments that do not allege to accurately represent the physical world (e.g., real world), users may still expect behaviors that match their expectation of how these objects should behave in the environment.

As an example, humans expect a crystal cup, dropped onto a rock surface, to make a shattering sound and break into pieces within certain bounded parameters. In contrast, a metal cup dropped onto the same surface should make a different sound and perhaps become dented. Further, a crystal cup dropped onto a pillowed surface should make no sound, not break, and barely bounce.

Textural data may be one important factor to facilitate accurate data rendering. The rendering may be any form of output that is perceivable to a user, including "feel". For example, texture data may be used to provide haptic feedback such as a silky "feel" or another type of feel According to another example, in the case of a car hitting its brakes, if the texture of the road and the texture of the tire are accurate, the car will leave skid marks, make a certain noise, and stop at a certain rate. By contrast, if the texture of the tire or road is wrong or inaccurate, it will be almost immediately clear to any user with experience of a vehicle stopping that the audio, visual, and/or physics of the object interaction is broken. Further, it should also be possible to perform mid-course corrections. For example, as the vehicle begins to slow, an improper rate of deceleration might trigger a biological response that may be used to modify the physics of the situation, as discussed herein.

Even the simple act of a virtual stone being thrown into a swimming pool versus a virtual beach ball being thrown into the same swimming pool may require an understanding of the texture and material composition of the water and the object. Further, there may be differences between underwater and dry object behavior. For example, a wedding ring clicked against a SCUBA tank makes about the same sound on the surface and underwater. However, the sound travels at a different speed. In another example, a hand scraped along the same tank may be quietly perceptible on the surface, but silent underwater. In another example, water temperature might be different depending on the climate. For example, a person that lives in Seattle may have an entirely different expectation of the "normal" July swimming pool temperature than would a person who lives in Phoenix.

Biometric feedback may further be utilized to drive, modify, and/or otherwise influence or create a storyline or set of events within a virtual environment, based on the likelihood that the user is in a certain state of mind or has responded positively to stimuli. For example, two avatars are presented to a user, one male and one female, and both are dressed provocatively. A user may be monitored for signs of sexual stimulation or interest, such as dilated pupils, blood flow to the genital area, increased respiration rate, and so on. The user's gaze direction may further be analyzed to determine whether the male, the female, or both avatars are of interest to the user. Based on that data, the user may be presented with additional environmental elements that are consistent, such as additional male avatars for a user who is stimulated by the male, and/or additional female avatars for a user who is stimulated by the female. Similar analysis may be made to determine the kinds of virtual clothing the user likes to wear and to see, the kinds of environments that the user finds most exhilarating, events that the user finds uninteresting, and so on.

The behavior of objects in a virtual environment depends on a physics engine, materials data, texture data, physics data, object interaction data, object temperature data, object visual data, object weight data, object size data, object physics data, and so on. Conventional technology does not provide a way to identify improper data, other than manual observation and reprogramming of object data when incorrect data is identified. This manual observation and reprogramming are problems made more complex by the variety of error sources that are available in a simulation based on multiple factors. It is perhaps one reason why conventional technology provides augmented reality environments that have bimodal surface characteristics, either "bumpable" or "not bumpable", since conventional technology does not allow easy collection and correction of the complex surface and composition data that exist in the real world.

In consideration of the various issues with conventional technologies for augmented reality experiences and their limitations, one or more embodiments described herein are directed to augmented reality objects based on biometric feedback. As disclosed herein, the biometric feedback may be based on any observable reaction from a user of the augmented reality. Such observable reactions include, but are not limited to, pupil dilation, perspiration, a change in a breathing rate, a heart rate change, eye movement, voice including tone and words spoken, brainwaves, muscle tone, skin conductance, and so on.

Measurements may be made of the electrodermal system, cardiovascular system, musculoskeletal system, nervous system, ocular system, eccrine system, reproductive system, genitals, lips, facial expressions, pupillary dilation, brainwaves, breathing rate, vocal characteristics, blood pressure, heart rate and heart rate variability, and so on. Without limitation, among the devices that may be utilized for obtaining feedback data may be a electromyograph, thermometer, thermistor, electrodermograph, electroencephalograph, photoplethysmograph, plethysmograph, pulse oximeter, electrocaridogram, pneumograph, capnometer, rheoencephalograph, hemoencephalograph, and so on. The biometric feedback may be used to change one or more parameters of the augmented reality experience.

In one embodiment, a method is described herein that includes determining, by a system comprising a processor, first response data representative of a first response to a first set of object data associated with a simulation of an interaction between a first virtual object and a second virtual object. The first response data comprises an indication that the interaction does not match an expected interaction and is received in response to an output of the first virtual object, the second virtual object, and/or the first set of object data. The method also includes modifying at least one object of the first set of object data to create a second set of object data associated with another simulation of the interaction between the first virtual object and the second virtual object. In addition, the method may also include outputting data representative of the first virtual object, the second virtual object, and the second set of object data.

In one aspect, the first set of object data comprises object interaction data, object texture data, and/or object composition data. In another aspect, a second response to the second set of object data produces another modification of at least one second object of the second set of object data or a linkage between the second set of object data and the interaction.

According to another example, the method may also include determining the at least one object for modification based on an aggregation of the first response data and third response data representative of a third response received in response to the data representative of the first virtual object, the second virtual object, and the first set of object data. The first response data and the third response data may be received from different sources of input.

According to a further example, the method may include receiving second response data representative of the second response that comprises another indication that the other simulation of the interaction between the first virtual object and the second virtual object is determined to be about the same as the expected interaction.

In still another example, the method may include outputting the first set of object data that comprises at least one of an object texture data, an object composition data, or an object interaction data.

According to another example, the method may include altering the at least one object or the at least one second object of the second set of object data based on second response data representative of the second response that indicates a second interaction between the first virtual object, the second virtual object, and the second set of object data does not match the expected interaction.

In still another example, the method may include determining the at least one object or the at least one second object for modification based on an aggregation of the second response data and third response data representative of a third response received based on another output of the first virtual object, the second virtual object, and the second set of object data. The second response and the third response are received from different sources of input.

In accordance with another example, the method may include receiving at least one of biometric response data representative of a biometric response from a biometric measurement device or sensory response data representative of a sensory response from a sensory measurement device.

According to still another example, the method may include receiving the first response data that comprises a set of impression data. In an implementation, the impression data may be indicative of the effect or impression the object has on the user. Thus, the impression data might be a biometric response or another response from the user. Further to this example, the method may include converting the set of impression data into feedback data representative of object interaction feedback, wherein the second set of object data is selected based on the feedback data.

In another example, the method may include initiating a rendering of the interaction between the first virtual object and the second virtual object. The interaction may include texture information, material composition information, or texture information and material composition information of the first virtual object, the second virtual object, or the first virtual object and the second virtual object.

In still another example, the method may include initiating storage of a set of initial data in a data store. The first set of object data comprises the set of initial data. Further to this example, the method may include initiating storage of a set of data received from a set of measurement devices as at least a portion of the first response data. The set of initial data and the set of data are associated with at least one virtual object that may include the first virtual object and the second virtual object.

According to a further example, the method may include creating a feedback loop based on receiving the first response, outputting the second set of object data, and receiving the second response.

In another example, the response to the output may be based on an interaction between the virtual object and a user that perceives the object through interaction with a force feedback device According to another embodiment, a system is described herein that includes a memory storing computer-executable components and a processor, coupled to the memory. The processor may be operable to execute or facilitate execution of one or more of the computer-executable components. The computer-executable components may include a virtual object manager configured to determine at least one representation of at least one virtual object of a set of virtual objects. The at least one representation may be based on a set of information that comprises one or more of object type data, object material composition data, object textual data, object temperature data, object visual data, object weight data, object size data, object physics data, or object interaction data. The computer-executable components may also include an analysis monitor configured to detect a response to an output of the at least one representation of the at least one virtual object. The response comprises an indication that the at least one representation of the at least one virtual object is an unexpected representation. Further, the computer-executable components may include an adjustment manager configured to modify at least a portion of the set of information based on the response and create at least a second representation of the at least one virtual object.

In an example, the computer-executable components may include an output component configured to convey the at least one representation to a first participant, and at least the second representation to a second participant different from the first participant. Further to this example, the analysis monitor may be further configured to detect another response to at least the second representation received from the second participant, which does not have to occur simultaneously.

According to another example, the output component may be configured to convey the at least one representation and at least the second representation as at least one of a tactile representation, an auditory representation, a visual representation, or a behavioral representation.

In accordance with another example, the computer-executable components may include an aggregation component configured to combine the response with other responses received in reply to the output of the at least one representation. The response and the other responses may be received from different participants. Further to this example, the adjustment manager may be further configured to modify at least the portion based on a combination of the response and the other responses.

In another example, the computer-executable components may include an accuracy component configured to determine an accuracy of the response based on an average of the response and the other responses, or based on at least one of a weighting associated with an accuracy of measurement equipment, a quality assigned to the measurement equipment, or respective characteristics of the different participants.

In one aspect, the analysis monitor is further configured to receive a biometric response from a biometric measurement device or a sensory response from a sensory measurement device.

In another aspect, based on a determination that the at least one virtual object corresponds to a real world object, the virtual object manager may be configured to simulate the real world object.

In accordance with another aspect, based on a determination that the at least one virtual object does not correspond to a real world object, the virtual object manager may be configured to simulate data determined to be appropriate for the at least one virtual object.

In accordance with another embodiment, described herein is a computer-readable storage device that includes executable instructions that, in response to execution, may cause a system comprising a processor to perform operations. The operations may include determining a first representation of a first virtual object of a set of virtual objects. The first representation may be based on a set of information that comprises one or more of object type data, object material composition data, object textual data, object temperature data, object visual data, object weight data, object size data, object physics data, or object interaction data. The operations may also include analyzing a response to an output of the first representation of the first virtual object. The response comprises an indication that the first representation of the first virtual object is an incorrect representation, and the response is received from a participant. Further, the operations may include modifying at least a subset of the set of information based on the response to create a second representation of the first virtual object. In addition, the operations may include analyzing another response to another output of the second representation of the first virtual object. The other response comprises another indication that the second representation is a correct representation or is still the incorrect representation.

In an example, the operations may further include combining the response with other responses received in reply to the output of the first representation. The response and the other responses may be received from different participants. Further to this example, the modifying at least the subset of the set of information may be based on a combination of the response and the other responses.

According to another example, the operations may include conveying the first representation to a first participant and conveying the second representation to the first participant or to a second participant different from the first participant.

Herein, an overview of some of the embodiments for providing augmented reality objects based on biometric feedback has been presented above. As a roadmap for what follows next, various example, non-limiting embodiments and features for an implementation of augmented reality objects based on biometric feedback are described in more detail. Then, a non-limiting implementation is given for a computing environment in which such embodiments and/or features may be implemented.

Augmented Reality Objects Based on Biometric Feedback

As disclosed herein, augmented reality objects may be refined based on biometric feedback from one or more users. For example, an object may be output by itself, or in combination with one or more other objects. At about the same time as the object is being output to a user, biometric data of the user may be collected or received and analyzed to determine the effect the object, or multiple objects, has on the user based, at least in part, on the biometric response (the biometric data of the user). If the biometric response is positive, modification of the object or one or more other objects might not need needed. However, if the biometric response is determined to be negative, modification of the object, one or more of the other objects, or both, might be made and one or more additional biometric responses might be solicited from a same user or a different user.

With respect to one or more non-limiting ways to manage augmented reality objects, FIG. 1 illustrates an example, non-limiting embodiment of a method 100 for creation and modification of augmented reality objects based on biometric feedback. The method 100 in FIG. 1 may be implemented using, for example, any of the systems, such as a system 200 (of FIG. 2), described herein below. Beginning at block 102, determine first response data representative of a first response to a first set of object data associated with a simulation of an interaction between a first virtual object and a second virtual object. According to an implementation, the first virtual object or the second virtual object may include a representation of a user. In another implementation, the interaction may be between a virtual object and a user that perceives the object through interaction with (e.g., wearing) a force feedback device. Thus, a virtual object may include, at least in part, a force feedback device.

Although discussed with respect to a first and a second virtual object, according to some implementations, more than two virtual objects may be presented and/or may interact in an augmented reality. Further, the first set of object data (as well as subsequent sets of object data) may include various components or objects. Such components or objects may include object interaction data, object texture data, and/or object composition data, for example.

Further, the components or objects may include appearance data and various aspects discussed herein with respect to texture data may be applied to appearance data. For example, it might be desirable to create a very attractive weight lifter. In this case, the face and/or body of the weight lifter may be modified and output in different presentations to different users. Based on feedback data, a combination of appearance data that provides the greatest indication of arousal in the user (e.g., pupils dilate, heart rate increases, and so on) may be determined. In a similar manner, food or smell representations may likewise be improved in accordance with the disclosed aspects.

According to some implementations, the first response may be based on a simulation of an interaction between a person and a virtual object. For example, the disclosed aspects may be applied to three-dimensional (3D) printed objects. A user may design a virtual object that is sent to a 3D printer for rendering as a real world object. By allowing the user to interact with the model in virtual space prior to printing, the same (or a similar) biofeedback as discussed herein may be utilized to guide design choices. In an example, force feedback may be used to allow a user to choose different material densities, material softness, material weights, and so on.

Humans generally know how things are supposed to feel, sound, smell, and look. For example, if a user runs his or her hands over a marble surface and the surface is hard, there is a first biological response received from the user. However, if the user runs his or her hands over a marble surface and the surface is soft, there is another biological response that is measurably different from the first biological response. In another example, if an interaction simulation is provided where a lead pipe hits a glass bottle and the glass bottle bends around the pipe, the biological response is measurably different than if the bottle reacts by breaking, which is expected. This is generally analogous to the biological response that a lie detector looks for, or the pupillary dilation that indicates human arousal. This biometric data may be obtained as response data.

For example, the first response data may comprise an indication that the interaction between the virtual objects does not match an expected interaction and may be received in response to an output of the first virtual object, the second virtual object, and the first set of object data. The indication may include observed pupil dilation, perspiration, a change in a breathing rate, a change in a heart rate, a verbal outburst, and so on. Block 102 may be followed by block 104.

At block 104, modify at least one object of the first object data to create a second set of object data associated with another simulation of the interaction between the first virtual object and the second virtual object. For example, if the first response data indicates the object(s) are not represented as expected, one or more changes, modifications, or adjustments may be made to provide a more accurate or expected representation. Such changes may include, for example, reversing a direction of a flow of water, altering a speed at which a car is moving, and so on. Such changes may be based on how a similar item might react.

For example, if there is a negative response to a virtual crystal glass falling on virtual concrete and not breaking, information related to a similar action of a similar object may be imitated to modify the interaction data between the crystal glass and the concrete. Thus, information related to a coffee cup (which may be defined as being in the same class as the crystal glass) may be used. Further to this example, the interaction between the coffee cup and the concrete might have been defined wherein the coffee cup breaks. Thus, since there was a negative reaction to the crystal glass not breaking, a second output may be that the crystal glass breaks, which mimics the coffee cup breakage.

According to an aspect, similar elements (such as "drinking cups") that evoke similar responses (such as "should break loudly when dropped") may be used to identify classes of objects that may, with regard to one or more characteristics, be treated similarly (such as crystal cups and glass cups with regard to breaking).

In another example, the crystal glass is outside when it is raining and a positive biometric response to the crystal glass filling with rainwater (as opposed, for example, to letting the crystal glass absorb the water and become soggy) is received. A similar reaction (e.g., filling with water) may be applied to other types of cups (e.g., a coffee cup). Therefore, reactions (or simulations) for other cups when exposed to rain should initially be to fill with water, subject to later revision if a subsequent response is not positive. Block 104 may be followed by block 106.

At block 106, output data representative of the first virtual object, the second virtual object, and the second set of object data. For example, texture data of the object may be refined by measuring human response to proposed texture and composition of objects when the objects interact with each other in a virtual environment. When a negative biometric response is received, the texture and/or composition of an object may be altered and the modified object interaction may be output in a perceivable format.

According to some implementations, glance direction and/or a length of time spent looking at an object may be utilized as biometric measures. For example, a background object, such as a chair, might normally merit at most a quick glance. However, if the chair is doing something wrong, such as bending when someone sits in it, the user might look at the chair for longer than what is considered a normal length of time for a background object. Such unexpected glance direction and/or length of time may be utilized, at least in part, as the biometric response.

Further, another biometric response may be received, which may indicate whether or not the new texture(s) and/or new composition(s) is more accurate. For example, a second response to the second set of object data may produce another modification of at least one second object of the second set of object data or a linkage between the second set of object data and the interaction. According to some aspects, the one object previously modified is again modified. According to other aspects, both the one object previously modified and at least one second object may be modified.

Thus, a feedback loop may be created based on receiving the first response, outputting the second set of object data, and receiving the second response (or subsequent responses). This feedback loop may be utilized to train a computer system to associate more correct object interaction data and/or texture data with any given object. The training may be performed through many techniques including Bayesian or other mechanisms, according to an aspect.

Augmented reality objects based on biometric feedback may be implemented in a variety of augmented reality spaces, including entertainment, business, and personal uses. The disclosed aspects allow for almost constantly updated object data, texture data, object interaction data, and texture interaction data that matches any number of objects, whether known, unknown, or arbitrary. Such updates may occur until positive responses are received for nearly all renderings on the one or more outputs. Such updates may also be made using different metrics for different cultural groups or other groups.

Further, the disclosed aspects provide texture data and/or object interaction data that feels subjectively accurate for objects that have no corresponding real world object. These objects include imaginary objects or arbitrary objects, for example. Such objects may be initially presented based on information inferred to be accurate for such objects. The presentation of the objects may be refined based on feedback from one or more users. Further, the presentation may be accurate across cultural and other lines through utilization of the disclosed aspects.

One skilled in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments.

Figure 2:
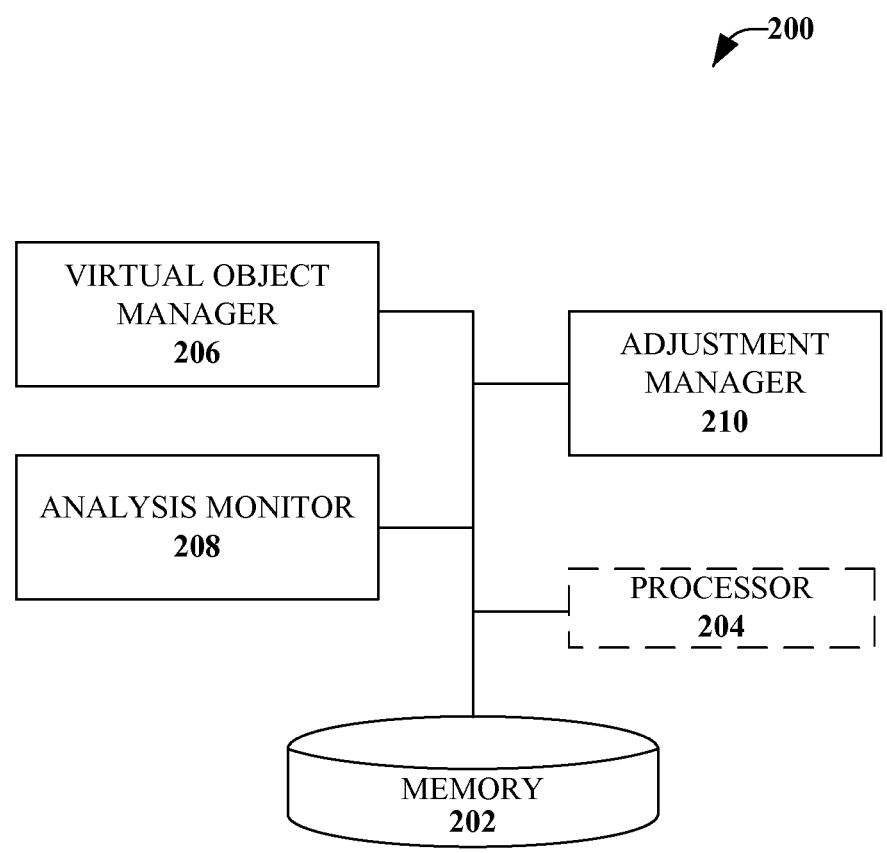
FIG. 2 illustrates an example, non-limiting embodiment of the system for creation and modification of augmented reality objects based on biometric feedback.

FIG. 2 illustrates an example, non-limiting embodiment of the system 200 for creation and modification of augmented reality objects based on biometric feedback. The system 200 may be configured to dynamically change one or more parameters of an object, or multiple objects, based on received biometric feedback. Further, the system 200 may be configured to modify the object data based on feedback from a single user or based on feedback from a multitude of users. The system 200 may take into consideration cultural differences between different users and may modify the output of various objects based in part on the cultural differences, or based on other differences among the various users.

The system 200 may include at least one memory 202 that may store computer-executable components and instructions. The system 200 may also include at least one processor 204, communicatively coupled to the at least one memory 202. Coupling may include various communications including, but not limited to, direct communications, indirect communications, wired communications, and/or wireless communications. The at least one processor 204 may be operable to execute or facilitate execution of one or more of the computer-executable components stored in the memory 202. The processor 204 may be directly involved in the execution of the computer-executable component(s), according to an aspect. Additionally or alternatively, the processor 204 may be indirectly involved in the execution of the computer executable component(s). For example, the processor 204 may direct one or more components to perform the operations.

It is noted that although one or more computer-executable components may be described herein and illustrated as components separate from the memory 202 (e.g., operatively connected to memory), in accordance with various embodiments, the one or more computer-executable components might be stored in the memory 202. Further, while various components have been illustrated as separate components, it will be appreciated that multiple components may be implemented as a single component, or a single component may be implemented as multiple components, without departing from example embodiments.

A virtual object manager 206 may be configured to determine at least one representation of at least one virtual object of a set of virtual objects. The at least one representation may be based on a set of information that includes one or more of object type data, object material composition data, object textual data, object temperature data, object visual data, object weight data, object size data, object physics data, or object interaction data. For example, the memory 202 (or another component, such as a database) may be configured to store object interaction information, texture information, material composition information, or other information determined to be output to a user that is perceiving an augmented reality. According to some implementations, the set of information may be associated with at least one specific object. For example, a mapping or other type of indexing may be utilized to cross reference information with object(s).

According to an implementation, based on a determination that the at least one virtual object corresponds to a real world object, the virtual object manager 206 may be configured to simulate the real world object, as discussed herein. In accordance with another implementation, based on a determination that the at least one virtual object does not correspond to a real world object, the virtual object manager 206 may be configured to simulate data determined to be appropriate for the at least one virtual object, as discussed herein. According to a further implementation, the virtual object manager 206 may be configured to present (or output) to different participants, or to the same participant at different times, variations on likely characteristics, and to measure the response to those variations to determine the best characteristics for the object.

As used in the context of a virtual object corresponding to a real world object, the word "correspond," or its derivatives, refers either to a one to one relationship with a real world item, or to an attempt to emulate a real world item, depending on the desires of the user and/or the system. For example, there may be objects that correspond to a real world object in part only. A person may have an avatar in an augmented reality environment that corresponds with the person (a real world item). However, the person might make his soft muscles super hard, alter his stomach to show a "six pack," as well as other modifications. In this case, although the avatar "corresponds" to a real world object, the avatar is intentionally dissimilar to the real world item in material respects.

In a similar manner, there may be an object with no real world corresponding item, but such an object may be realistic. For example, a computer controlled avatar that is rendered perfectly photorealistically. There may be no directly corresponding real world item, however, the virtual object may be designed to "correspond" with attractive people as a class. In accordance with a further aspect, there may be an object that is rendered non-realistically and/or which has no real world corresponding item. For example, a computer controlled "zombie" may have no corresponding real world item. However, the virtual object may be deemed to "correspond" with fictional items as a class, with fictional "bad guys" as a class, and/or with other subsets or supersets of the general class of item. Consistency or lack of consistency in biometric response(s) may be used to refine which objects should be in identical, related, or unrelated classes with regard to one or more characteristics.

According to some implementations, the virtual object manager 206 may be configured to perform object management separately from object characteristic management, or another component may perform the object management, based on security concerns that might dictate the separation of these functions. For example, ownership of an object, permissions for the object to interact with other objects, and so on, may be managed separately from the object texture, appearance, or other tactile or sensory characteristics of the object.

An analysis monitor 208 may be configured to detect a response to an output of the at least one representation of the at least one virtual object. The response may include an indication that the at least one representation of the at least one virtual object is an unexpected representation. However, it is noted that the response need not be binary (e.g., expected, unexpected). According to some implementations, there may be a scoring element where a user's "normal" response to an unexpected object is used to establish subjective adjustments to a threshold. For example, a user who is taking prescription beta blockers will have a far more subtle biological response to an unexpected element than would somebody taking prescription stimulants, such as methylphenidate. The level of response may also be used to predict the level of adjustment that should be applied. For example, an object that feels (to the user) a little bit wrong might need a more nuanced adjustment than an object that feels (to the user) entirely wrong.

According to some implementations, the analysis monitor 208 may be configured to receive a biometric response from a biometric measurement device or a sensory response from a sensory measurement device.

For example, the analysis monitor 208 may be communicatively coupled to various sensory devices. Such sensory devices may include augmented reality devices. Examples of these devices may include cameras, microphones, 3D imaging systems (e.g., motion sensing input device(s), light field sensors, a camera with a single lens (or multiple lenses) that utilizes light field technology, forward looking infrared sensors, and so on), and other devices.

The analysis monitor 208 may also be associated with one or more devices capable of measuring other biometric data. Such devices include cameras, pulse oximeters, microphones, blood pressure monitors, near field infrared, functional MRI, brain wave measurement equipment, skin resistance measurement, blood pressure measurement, pupil and facial muscle measurement devices, and/or other devices (including other devices discussed throughout this disclosure but not repeated here for purposes of simplicity).

According to an implementation, the memory 202 (or other component or database) may be seeded with initial data, and may be further populated with data received from one or more sensory devices and/or one or more devices capable of measuring other biometric data. For example, texture information, object interaction data, and other information may be populated in the memory 202. At least some of the addition data received from the devices may be associated with one or more specific objects.

Further, an adjustment manager 210 may be configured to modify at least a portion of the set of information based on the response and create at least a second representation of the at least one virtual object. The object(s) chosen for modification might be based on similarity of responses across multiple users, temporal proximity of object interaction to biometric response, or other factors. For example, a person might touch two objects nearly simultaneously. Thus, the determination of which object the user is reacting to might be based on responses from others that interacted with each object separately. Such distinct interactions and associated responses may provide additional data that helps determine which object is the object of concern in the instance where a choice between two or more objects is to be made.

According to some implementations, the modification performed by the adjustment manager 210 does not need to be performed at the same time the feedback is received or even with the same user. In some instances, particularly where it might be important that the virtual environment not be "breached" by unrealistic events, it may be worse to modify an object that feels wrong (to the user) than to simply leave the object as-is for that user in that instance. Instead, the correction may be saved and applied for a later user or instance. In an aspect, data may be aggregated across a plurality of similar instances where, in some cases, the object is left as-is, and in other cases, the object is modified. The biometric data gathered in response to such instances may be utilized to determine whether, in a similar or analogous situation, the object should be modified, modified less than fully, or left unmodified.

The second representation may be stored in the memory 202 (or another component or database). Thus, the biometric data generated in response to the conversion of database entries (e.g., stored in the memory 202) into object interaction feedback (e.g., visual, auditory, and so on) may be analyzed within the system 200. Such analyzing may be performed locally (e.g., internal to the system 200), remotely (e.g., external to the system 200) such as by the sensory devices and/or biometric devices, or both locally and remotely.

In accordance with an aspect, the object interaction data may be altered "on the fly" in response to biometric feedback (e.g., at about the same time as the feedback is being received). For example, if a drink is spilled on a tilted marble surface, the user expects the liquid to flow relatively rapidly toward a lower edge of the surface. The user does not expect the liquid to flow upward through capillary action, to remain in place, or to spread very far horizontally. As the liquid begins to flow incorrectly, for example by flowing upward through what the system 200 incorrectly interprets as object-appropriate capillary action (based on information retained in the memory 202, for example), the user's biometric response may be measured and, based at least in part on the biometric response, it might be determined that the object behavior is incorrect for the particular scenario. The adjustment manager 210 may slow or cease the represented capillary action, while continuing to output the visual representation. The user's response may continue to be measured and the analysis monitor 208 might determine that the user's biometric response normalizes. In this case, the system 200 may complete the object interaction with the modified object characteristics of having no capillary action. According to some aspects, the associated database entries (e.g., stored in the memory 202) may be corrected or altered.

According to some aspects, biometric feedback may be used to predict the behavior that a user desires or expects. For example, if a user is on a level portion of a virtual roller coaster, and if the user's heart rate increases, it may be inferred that the user expects the car to soon enter a more intense portion of the ride. In a similar manner, returning to the example of the drink spilled on a tilted marble surface, the user may look in the direction she expects the water to flow, may place a hand to block flow in the direction the user expects the water to flow, may move a dry item away from the direction the water is expected to flow, or otherwise takes one or more actions that may be used to inform the system as to the user's expectations. In response to such data, the system may change the scoring of the various inputs used by the system to determine how to present environmental elements and/or may present environmental elements in a manner that matches the user's expectations. In some instances, it may be desirable to surprise the user, in which case such data (e.g., biometric data generally as described herein) may be used to determine how to best deliver an unexpected result to the user.

According to another example, biometric response (or another parameter) may be utilized to determine whether an avatar or other element being presented to the user does not make sense to the user. For example, if an avatar is the wrong age for the user, other users may react to the age difference. In a similar manner, if a virtual police car is presented that makes an American siren sound, but the user is British, the system 200 may identify that the sound is incorrect based on biometrics. Thus, when determining how to present an element that has more than one "correct" presentation, the system 200 may take into account the user's response(s). Further, with regard to an example user in Israel, if the system 200 cannot determine if Israel uses the American or the British ambulance sound, the system 200 may monitor biometric feedback in users with geolocation (e.g., geoIP or another location based system) data that indicates those users are from Israel and, based on that experience, the system 200 may create a more general rule about which siren sound is "normal" for those users.

In another example, if a user puts a hand in flowing water (during the augmented reality experience), but finds that the force of the water against the hand is too high relative to perceived motion of the water, the user's response may be measured and determined to indicate the water flow is incorrect. The system 200 may alter the water speed (either the haptic data for the water flow or the displayed water speed) until the measured user's biometric response normalizes. Thereafter, the system 200 may complete the object interaction with the modified object characteristics. Additionally, one or more data entries may be corrected or altered with the modified object characteristics.

According to some implementations, one or more other parameters may be utilized in addition, or as an alternative, to the biometric response. For example, when the user places his hand in flowing water, the user may tense his muscles (consciously or subconsciously) in an amount appropriate to the amount of resistance the user thinks he will need to exert in order to prevent his hand from moving. The system 200 may measure the angle of the user's hand, the muscle status, and so on, in order to determine the characteristics the user expects. Based at least in part on this analysis, the system 200 may modify the characteristics of the water, in this example, prior to the user actually perceiving the object behavior.

According to an implementation, in some virtual reality environments, there may be distant objects. The system may have some idea of how far the objects are away from a user, for example, but that idea may be at odds with the expectation of the user. An example is of lighting and thunder during a rainstorm. Humans expect a delay between perceiving the lighting visually and perceiving the associated sound of thunder. The amount of delay indicates the distance of the lighting. Biometric feedback may be used to determine when the sound is presented too early or too late relative to the user's expectation. For a virtual reality environment where the illusion of accuracy is more important than accurately portraying the distances used to generate the environment, object distances may be adjusted to meet user expectations.

Figure 3:
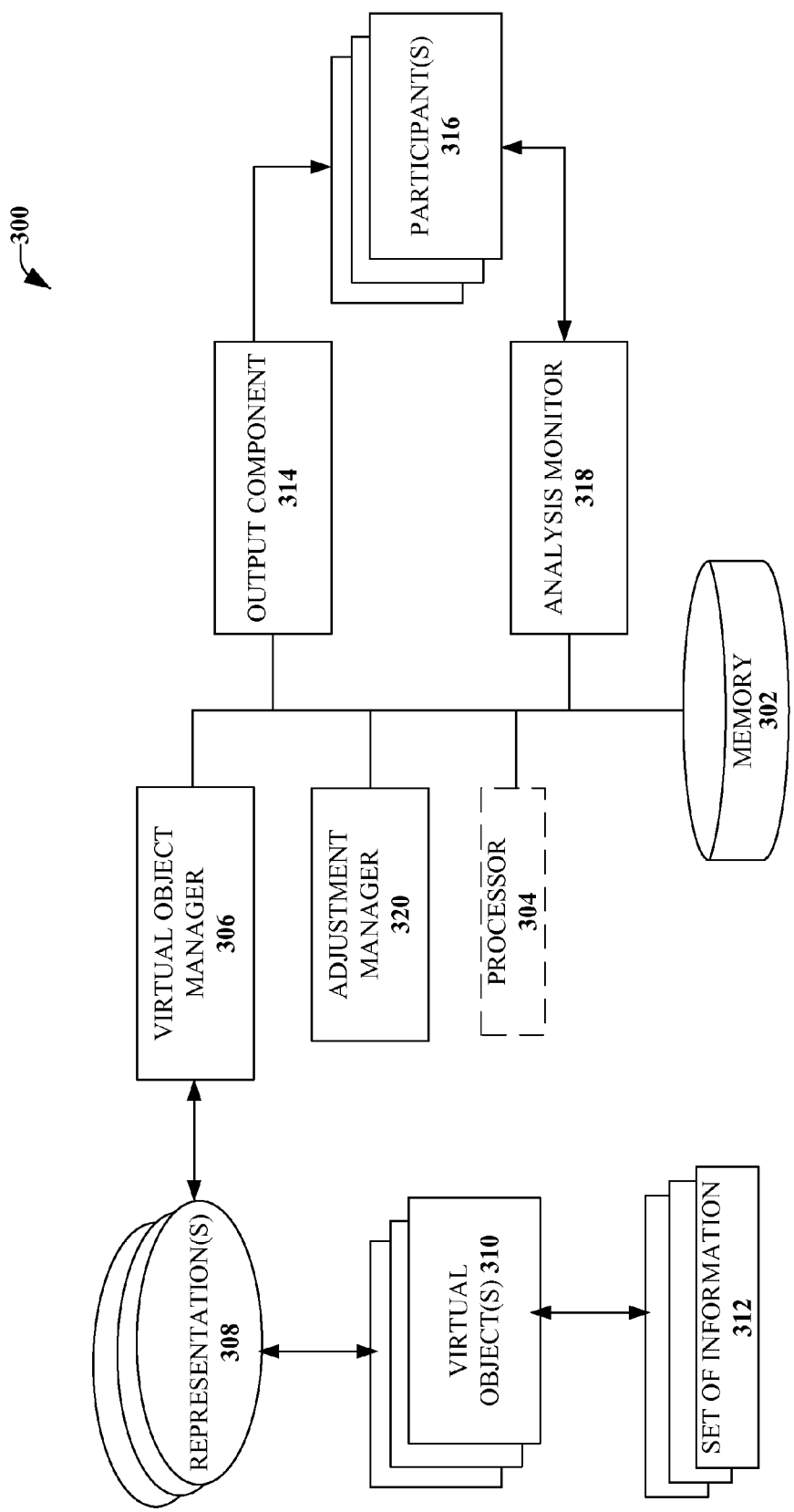
FIG. 3 illustrates an example, non-limiting embodiment of a system configured to selectively output object data in a virtual computing environment.

FIG. 3 illustrates an example, non-limiting embodiment of a system 300 configured to selectively output object data in a virtual computing environment. The system 300 may include at least one memory 302 that may store computer-executable components and instructions. The system 300 may also include at least one processor 304, communicatively coupled to the at least one memory 302. The at least one processor 304 may be operable to execute or facilitate execution of one or more of the computer-executable components stored in the memory 302.

As illustrated, a virtual object manager 306 may be configured to determine one or more representations 308 of one or more virtual objects of a set of virtual objects 310. The representations 308 may be based on a set of information 312, a portion of which may be associated with the one or more virtual objects 310. According to an aspect, the set of information 312 may be stored in the memory 302, however, the disclosed aspects are not so limited and the set of information 312 may be stored on another system 300 component or may be stored external to, but accessible by, the system 300. The set of information 312 may include one or more of object type data, object material composition data, object textual data, object temperature data, object visual data, object weight data, object size data, object physics data, or object interaction data.

As mentioned, at least a portion of the set of information 312 may be associated with one or more virtual objects 310. For example, seed information may be initially provided wherein various information about an object, interactions between two identified objects, and other information is known and may be mapped to a particular object. For example, the result of a rock being thrown and skipped along a pond surface may be known and entered (e.g., when the virtual object is created or at a different time). In such a manner, the action of the rock is associated with a representation of the rock and the reaction of the pond surface is associated with a representation of the pond.

However, there are some objects and/or object interactions for which initial data is not available. For example, in the case where there is no real world object related to the virtual object (e.g., a mermaid, a unicorn a mythical place, or other objects of the mind or a prototype for a new object), there might not be any initial data available. According to some aspects, a nearest identifiable object is associated with these types of objects. For example, a horse might be associated with the unicorn. Thus, the system 300 might attempt to create a virtual representation based on other data available for the object.

Object data that might be appropriate for the object might be pulled from the set of information 312 in an attempt to represent that object in augmented reality. In the above example, the object data for a horse may be accessed for the virtual representation of the unicorn.

In another example, for a mermaid, data related to a woman and a fish might be obtained from the set of information 312, although such information is not initially mapped to a mermaid. An inference may be made by the system 300 based on the information available. If the output of this information were a fish's head and a woman's legs, the response from the user would indicate that the representation is incorrect and modifications may be made as discussed herein.

In another example, object interaction between an airplane and a tree might not be initially included in the set of information 312. However, data related to each object separately might be used and the system 300 may make an inference based on how these items might interact. Further information related to inferences will be provided later in this description.

In another example, the system 300 may ask the user "how do these objects interact." For example, a program may be utilized that allows users to assist with development (or modification) of a database of objects. By way of example and not limitation, the user may be presented with two different object interactions. One of the object interactions is known (e.g., the system 300 has assigned a high confidence score to this object interaction). The other object interaction is something the user is to provide (e.g., what the system 300 would like to know, or has not assigned a confidence level to yet). The user confirms by identifying which one of the object interactions is the correct interaction, from the perspective of that user.

An output component 314 may be configured to convey the at least one representation of the virtual object (or more than one virtual object) to one or more participants 316. The one or more virtual objects might be output to two or more participants at about the same time, or at different times. According to various implementations, the output component 314 may be configured to convey the one or more representations as at least one of a tactile representation, an auditory representation, a visual representation, an olfactory representation, and/or a behavioral representation.

Further, an analysis monitor 318 may be configured to receive a response to the representation from the one or more participants 316. The responses may include an indication that the output representation is correct. However, according to an implementation, one or more responses may include an indication that the output representation is incorrect, or is not what a participant expected. According to some implementations, a prompt may be output to the participant requesting confirmation of the response. For example, the prompt may ask the user to confirm that the output representation is incorrect, or is correct, depending on the situation.

Further, each of the different participants might have different responses. It is noted that with biological responses, each of the responses will be unique. However, there most likely will be a cluster near the "correct" response. Further, there will be outliers, which might be represented in a manner similar to a bell curve. For example, one participant might have a response that indicates the output is correct, while another participant has a response that indicates the output is incorrect. These disparate responses may be considered when changes to the output of the one or more objects are being made. For example, the responses may be aggregated and changes made based on the aggregation. Thus, if more participants indicate the output is correct than those participants that indicate the object is incorrect, the object might not be modified. In another example, consideration may be given to various characteristics of participants and/or measurement devices, as will be discussed in further detail below.

According to some aspects, user responses may have more than one mode (e.g., bimodal, trimodal, and so on). The system may utilize demographic and/or physiological data about the user(s) in order to determine if there is a correlation between expectations and such data, and if there is a correlation, the system may determine which of the plurality of modes to utilize in the future, based on the user's demographic and/or physiological data.

If the output representation is determined to be inaccurate, an adjustment manager 320 may be configured to modify at least a portion of the set of information 312. In an implementation, the adjustment component 320 may be configured to modify at least the portion of the set of information 312 based in part on a comparison of the biometric data with manually obtained data or other data in order to determine which object of a plurality of objects is most likely to have triggered the biometric response.

The modified portion of the set of information 312 may be retained in the memory 302, added to a database, or retained in another component. According to some implementations, both the original set of information (or a previous version of the set of information) and the modified set of information are retained. Thus, if needed, an original or previous version of the set of information may be accessed.

Further, the sets of information may be categorized based on attributes of the participants. For example, a set of information and corresponding virtual objects rendered on a display, output audibly through speakers, output through olfactory devices, and/or other output devices might be different if the participant is a child or an adult. Thus, a first set of information may be retained for output to a child and a second set of information may be retained for output to an adult. Although discussed with respect to age, other characteristics of the participants may be utilized to selectively modify and render virtual objects in an augmented reality environment.

Further, another characteristic may relate to the amount, type, and quality of the biometric measurement data available. For example, if one user has a full setup and a second user has only a webcam, more weight might be assigned to the response from the first user (e.g., the user with the more data). Further, an "apples to apples" comparison might be achieved by clustering people together based on similarities of the measurement equipment.

The modified set of information may be conveyed to the one or more participants 316 by the output component 314. Further, additional response data may be solicited from the one or more participants 316. If the additional response data indicates the modified set of information is correct (or more accurate), no further action might be taken. However, if the additional response data indicates the modified set of information is incorrect (is not accurate, or is worse than the previous version of information), additional modifications may be made by the adjustment manager 320. Thus, a feedback loop may be created based on the receipt of the first (or initial) response by the analysis monitor 318, the conveyance of the second set of information by the output component 314, and the receipt of the second (or subsequent) response by the analysis monitor 318.

The feedback loop may be utilized to train a computer system to associate more correct object interaction data and/or texture data with any given object. The training may be performed through many techniques including Bayesian or other mechanisms, according to an aspect.

For example, a machine learning and reasoning component may be implemented in the system 300. The machine learning and reasoning component may employ principles of probabilistic and decision theoretic inference and rely on predictive models constructed through the use of machine learning procedures. Logic-centric inference may also be employed separately or in conjunction with probabilistic methods. For example, the machine learning component may infer interpretation of a response by obtaining knowledge about the various response indications and knowledge about what the user is trying to convey based on the response. Based on this knowledge, the machine learning component may make an inference based on which objects to alter, what attributes of the object should be altered, and so on.

The various aspects (e.g., in connection with conveyance and modification of virtual objects and interaction between virtual objects) may employ various artificial intelligence-based schemes for carrying out various aspects thereof. For example, a process for determining if a particular response is associated with a first virtual object or a second virtual object, and which modification should be made based on the particular response may be enabled through an automatic classifier system and process.

A classifier is a function that maps an input attribute vector, $x=(x1, x2, x3, x4, xn)$, to a confidence that the input belongs to a class, that is, $f(x)=confidence(class)$. Such classification may employ a probabilistic and/or statistical-based analysis (e.g., factoring into the analysis utilities and costs) to prognose or infer an action that a user desires to be automatically performed. In the case of virtual objects, for example, attributes may be object interaction data, object texture data, and object composition data and the classes are types or categories of virtual objects, types or classifications of participants.

A support vector machine (SVM) is an example of a classifier that may be employed. The SVM operates by finding a hypersurface in the space of possible inputs, which hypersurface attempts to split the triggering criteria from the non-triggering events. Intuitively, this makes the classification correct for testing data that is near, but not identical to training data. Other directed and undirected model classification approaches include, for example, naïve Bayes, Bayesian networks, decision trees, neural networks, fuzzy logic models, and probabilistic classification models providing different patterns of independence may be employed. Classification as used herein also is inclusive of statistical regression that is utilized to develop models of priority.

The one or more aspects may employ classifiers that are explicitly trained (e.g., through a generic training data) as well as implicitly trained (e.g., by observing user behavior, receiving extrinsic information). For example, SVM's are configured through a learning or training phase within a classifier constructor and feature selection module. Thus, the classifier(s) may be used to automatically learn and perform a number of functions as described herein.

According to some implementations, the output component 314 may be configured to convey at least one representation to a first participant and at least a second representation to a second participant different from the first participant. For example, the first response may be received from a first participant and, instead of outputting the modified object to the first participant, the modified object may be output to another participant. Further to this implementation, the analysis monitor 318 may be configured to detect another response to at least the second representation received from the second participant. Further modifications may be made to the object based on the response from the second participant.

In another implementation, priorities may be assigned related to which input a user receives. For example, a VIP user may be presented with "best guess" representations, while a less important user may be presented with a representation that is more geared toward data gathering. As applied, this might be similar to the following: The VIP user spills a glass of molasses and is presented with what the system currently knows to be the appropriate speed of spill spread. The non-VIP user may be presented with a slower than an appropriate speed of spill in order to gather biometric data more aggressively.

Figure 4:
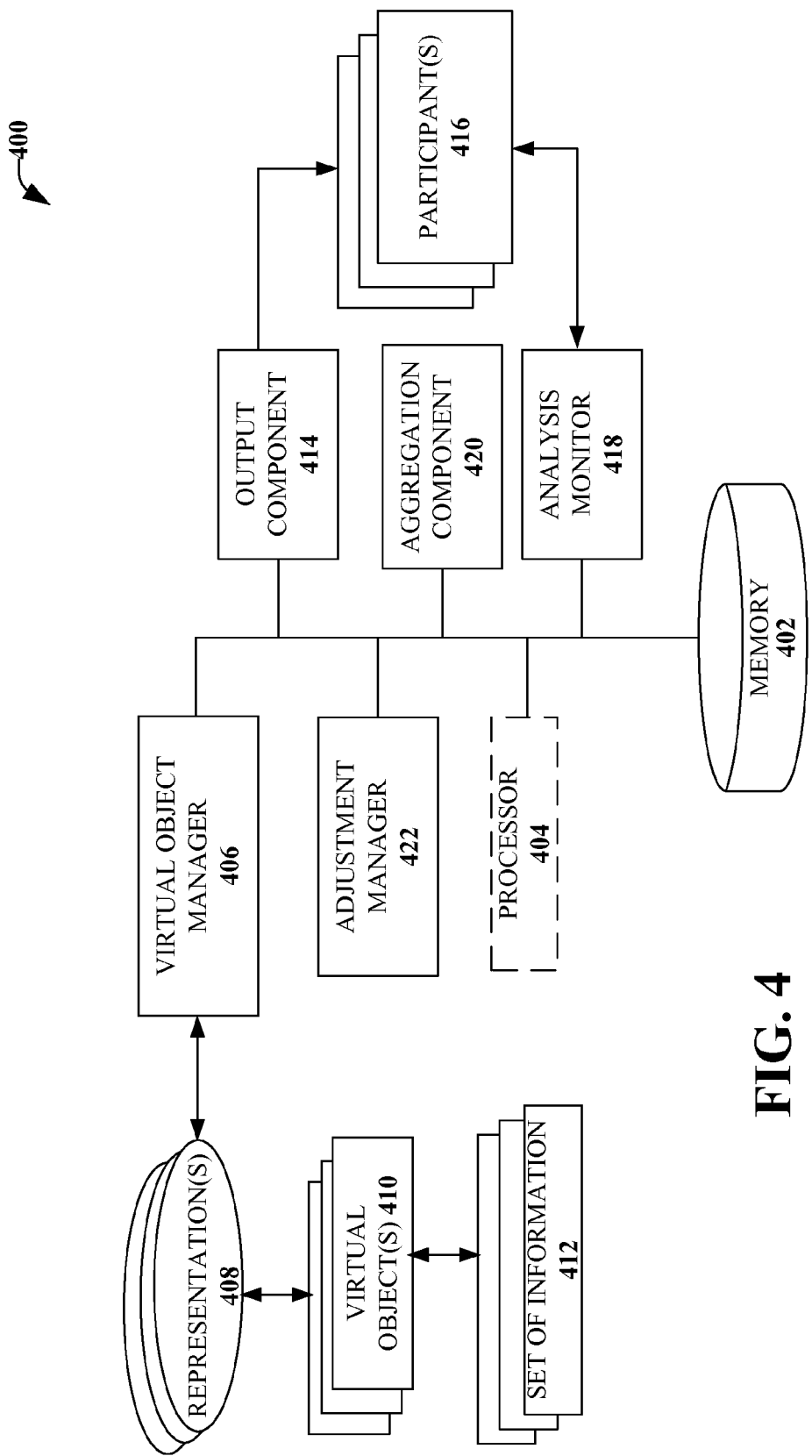
FIG. 4 illustrates an example, non-limiting embodiment of a system for combining feedback received from two or more participants in response to presentation of one or more virtual objects.

FIG. 4 illustrates an example, non-limiting embodiment of a system 400 for combining feedback received from two or more participants in response to presentation of one or more virtual objects. The system 400 may include at least one memory 402 and at least one processor 404, communicatively coupled to the at least one memory 402. The memory 402 may store computer-executable components and instructions. The at least one processor 404 may be operable to execute or facilitate execution of one or more of the computer-executable components stored in the memory 402.

Also included in the system 400 may be a virtual object manager 406 configured to determinate one or more representations 408 for one or more virtual objects of a set of virtual objects 410. The one or more representations 408 may include data indicative of how each of the one or more virtual objects are represented in an augmented reality environment. For example, the virtual objects may be represented as a tactile representation, an auditory representation, a visual representation, a behavioral representation, or combinations thereof. The one or more representations 408 may be based on a set of information 412, which may include object type data, object material composition data, object textual data, object temperature data, object visual data, object weight data, object size data, object physics data, object interaction data, or combinations thereof.

An output component 414 may be configured to output the one or more representations to one or more participants 416. For example, the one or more participants 416 might be participating in a shared augmented reality experience. However, according to other examples, the one or more participants 416 might be participating in separate augmented reality experiences. Further, there might not be any overlap between a first augmented reality experience of a first participant and a second augmented reality experience of a second participant.

According to some implementations, the system 400 may be configured to gather data by injecting objects into virtual reality environments. For example, some users may be provided free access to an environment in exchange for agreeing to have certain elements added to the environment from time to time. When data is need for a paying user that has built an object, for example, and the system 400 does not know what the tactile characteristics should be, the same object may be injected into free user's environment as well in order to gather data on that user's response. In some implementations, the user selected for data gathering may share one or more demographic and/or other characteristics with the user for whom the data is being gathered, thereby improving the chances that the users will have similar expectations and perceptions.

An analysis monitor 418 may be configured to detect one or more responses to the output of the one or more representations. Such responses may be received directly by the analysis monitor 418 or indirectly through an interface with one or more measurement devices.

Further, an aggregation component 420 may be configured to combine the response from a first participant with other responses received from other participants in reply to the output of at least one of the virtual representations. According to an aspect, the different responses received may be from two or more participants in a shared augmented reality experience. According to another aspect, the different responses may be received from two or more participants that are in separate augmented reality experiences. Further, the response may be received at substantially the same time, or at different times.

For example, the output component 414 may convey a first object to a first participant today, and may convey the first object to a second participant tomorrow. The aggregation component 420 may be configured to aggregate the response received today with the response received tomorrow.

The aggregation component 420 may be configured to aggregate the various responses based on one or more characteristics of the participants. For example, the aggregation component 420 may be configured to aggregate the response based on cultural, religious, age, gender, disability, education, or other characteristics. Such characteristics may be based on information provided by each participant, information learned from each participant based on interactions with the system 400, based on an inference, based on payment or type of membership, or based on other factors (e.g., a social network, demographics, employer information, and so on). It is noted that users who have a greater level of experience with virtual reality or other enhanced or artificial environments may have a different biometric response when compared to users without such experience. For example, a former user of a virtual environment with low quality rendering, when using a different virtual environment, may find a low quality rendered avatar more "normal" than users without such experience. Where "demographic" similarities between users are described herein, it should be understood to encompass user experience with virtual and/or enhanced environments and similar experiences.

For example, young children may not have experience with certain object interactions, object textures, or other object data. Therefore, it cannot be guaranteed that accurate texture biometric feedback will be received from this group of young children. In a similar manner, imaginary objects, such as a ball that magically bounces with no loss of energy to friction may have no real world corresponding texture. In this case, it may be desirable to determine an expected texture by matching the texture data to positive biological responses across a set of participants.

In another example, a person in a dry climate might have different experiences with objects than a person in a wet climate or in the tropics might have. For example, a person in a dry climate might expect denim to feel soft and dry, while a person in a wet or hot climate might associate damp, soft cotton with the feel of denim Such differences may be accounted for and the appropriate expected representation may be output based on the particular user experiences (e.g., location of the user).

In still another example, different languages characterize common sounds differently. For example, a rooster's crow is a "cock-a-doodle-doo" in English, "quiquiriqui" in Spanish, "kukareku" in Russian, and "kikeriki" in German. In a similar manner, people in identifiable groups (e.g., age, gender, religious, cultural background, and so on) may have different expectations as to tactile or other object characteristics. Such data may be used to create separate databases (which may be stored in the memory 402 or another component) for different groups. According to some aspects, the data may be used to weigh certain database entries higher than other database entries for certain groups (particularly when creating data that is a combination of more than one database entry). In another aspect, the data may be used to allow people from one group to experience tactile experiences that match the subjective experiences of another group.

Based on the responses combined by the aggregation component 420, an adjustment manager 422 may be configured to modify at least a portion of the set of information based on the aggregated response. The modified object(s) may be conveyed to one or more users by the output component 414.

According to some implementations, the system 400 may begin by gathering data for use across all groups. Once enough data has been gathered to be statistically significant for subgroups, then different outputs may be created based on that subgroup.

Further, in the case of allowing a participant of one group to experience the augmented reality from the perspective of another group, the participant may interact with the system 400 to request an alternative perspective and the output component 414 may be configured to output the appropriate augmented reality experience.

According to some implementations, a person with a physical impairment might experience objects differently than persons without physical impairments. Thus, the system 400 may be configured to adjust output data based on the physical limitations of a user. For example, a deaf person will not hear sounds. However, another output may be presented to replace the sound. Such outputs may include visual representations, such as lights, which may be blinking, colored, or output in another manner, such as flashing in particular sequence. Other outputs may include sensory information, such as a texture of an object that is used to represent the sound, and so on. Further, the particular data to be output may be made such that a response to the output, by the deaf person, is similar to the response a person hearing the sound would have. For example, the particular data output might be modified iteratively over various times and users until a determination is made that a particular output generates about the same response (e.g., biometric response) in a deaf person as would be generated by the sound for a hearing person. Such iteration may be performed with a single user or with one or more users having similar or identical impairments.

For example, a participant may interact with the system 400 through various interface devices. Examples of interface devices include, but are not limited to, a cellular telephone, a cordless telephone, a Session Initiation Protocol (SIP) phone, a smart phone, a feature phone, a wireless local loop (WLL) station, a personal digital assistant (PDA), a laptop, a handheld communication device, a handheld computing device, a netbook, a tablet, a satellite radio, a data card, a wireless modem card, a wearable display (e.g., a wearable computer, which may be embodied on glasses, for example), an immersive display (e.g., a virtual reality head mounted display), and/or another processing device for communicating over a wireless system.

According to an implementation, the analysis monitor 418 may be configured to detect inappropriate behavior of one user based on responses of other users. For example, a persistent problem faced by users of multi-user virtual reality and other environments is that of "griefing." The term "griefing" relates to the situation where a player or user (or multiple users) takes steps to worsen the experience for other players or users. Biometric data from one or more users may be analyzed to determine whether any given user is griefing, likely to be griefing, and/or engaged in or likely to be engaged in other undesirable behavior. For example, a camera may detect a grimace on the face of other users who are in the same (or a similar) virtual room as a person, and the grimace may serve as an inference that the person is griefing. Based on one or more instances of this, as appropriate, a person may review the data and/or the system may restrict or prevent user access and/or certain behaviors for the person doing (or suspected of doing) griefing.

Figure 5:
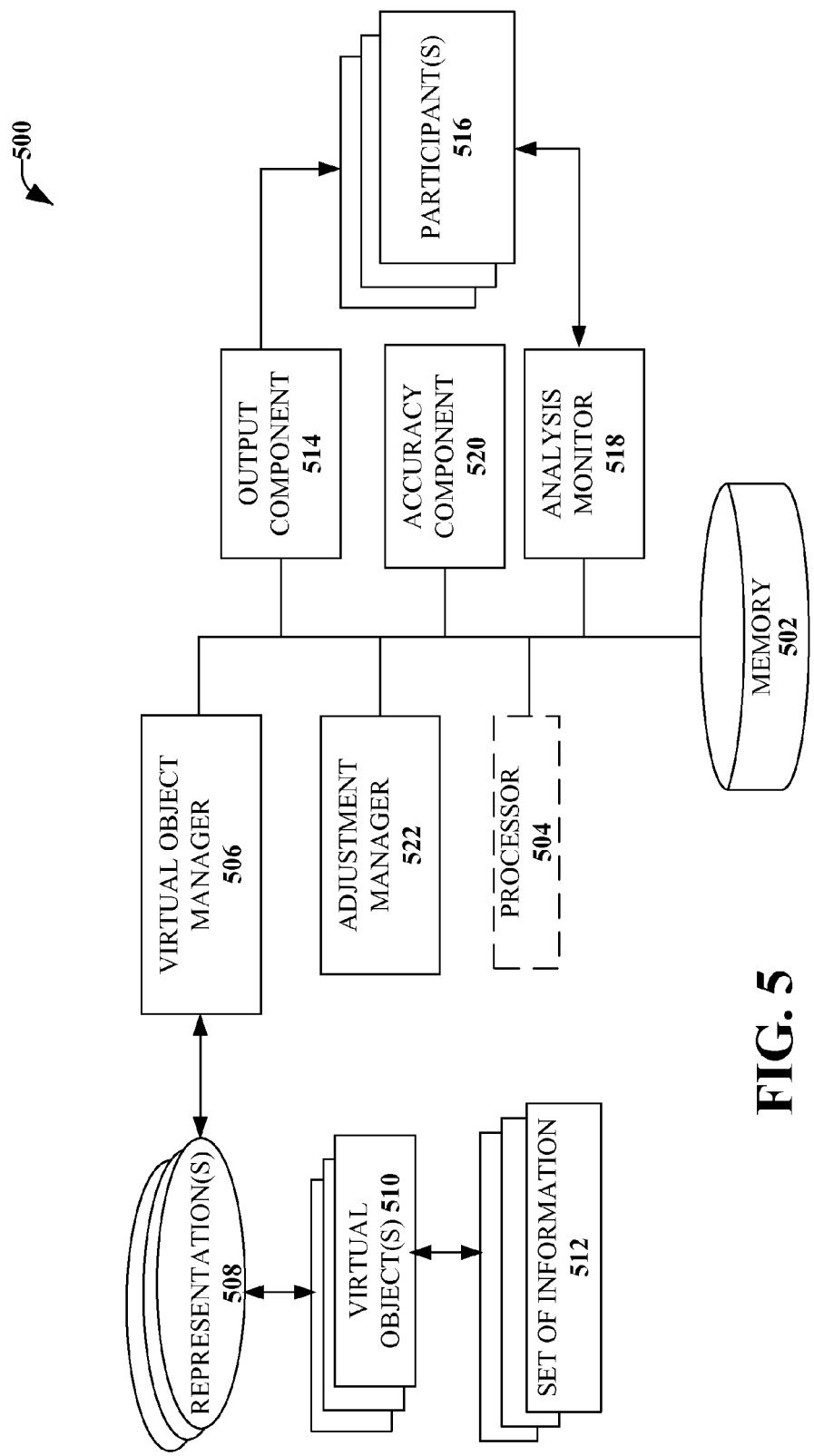
FIG. 5 illustrates an example, non-limiting embodiment of a system for determining an accuracy of various sources of input based on an augmented reality environment.

FIG. 5 illustrates an example, non-limiting embodiment of a system 500 for determining an accuracy of various sources of input based on an augmented reality environment. The system 500 may include at least one memory 502 and at least one processor 504, communicatively coupled to the at least one memory 502. The memory 502 may store computer-executable components and instructions. The at least one processor 504 may be operable to execute or facilitate execution of one or more of the computer-executable components stored in the memory 502.

Also included in the system 500 may be a virtual object manager 506 that may be configured to determine representations 508 for virtual objects 510 based on a set of information 512. The set of information 512 may include object type data, object material composition data, object textual data, object temperature data, object visual data, object weight data, object size data, object physics data, object interaction data, and other data that may be utilized to render the object in a augmented reality environment. According to an implementation, the interaction is a remote surgical application.

Also included may be an output component 514 that may be configured to convey the virtual objects 510 to one or more participants 516. For example, the output component 514 may convey the virtual objects 510 to the participants 516 at about the same time, or at different times. For example, the output component 514 may convey a virtual object to a first participant. Later (e.g., minutes, hours, days, and so on), the output component 514 may convey the same virtual object to a second participant and, at a later time, to a third participant at another time.

An analysis monitor 518 may be configured to detect a response from the one or more participants. The response may be detected at about the same time as the virtual object is conveyed to each participant. For example, at about the same time as the output component 514 conveys the virtual object (and while the virtual object continues to be conveyed to the participant(s)), the analysis monitor 518 may detect the various responses.

The analysis monitor 518 may be configured to determine, among two or more virtual objects, the object to which the participant is reacting based on the gaze of the user, positioning of the user's head, data known about each object, and/or through an inference. For example, cameras or other means of determining where the user is gazing or which object the participant is looking at may be utilized. In another example, the direction in which the user is looking may be based on the positioning of the head (e.g., is the participant looking to the left, to the right, or straight). In another example, if the interaction is between virtual wood and virtual moss, there might be a large amount of data already available for the wood, however, there might not be as much data available about the moss. Therefore, in this situation, it may be determined that the reaction is to the moss, since more information is already available (and presumably tested) for the wood. Thus, the wood may be excluded since the system 500 may have a confidence level that indicates the wood is being represented correctly.

An accuracy component 520 may be configured to determine an accuracy of a response or accuracy of multiple responses. The response data may be utilized to determine the level of accuracy that the end user experiences as a result of the data presentation. The accuracy measurement may be averaged with other user data, scaled and/or changed in weighting based on the quality of the equipment, accuracy of the measurements, characteristics of the users, or other factors. According to some implementations, the accuracy might be determined as a weighting based on the probative value of the biometric data source. For example, a change in heart rate may be more probative of a stress response than a change in breathing rate, both of which are more probative than tensing of the hand muscles.

Accuracy may include a set level of variability. For example, different woods, and even different trees of the same or similar type, have different characteristics. Some are softer, some are wetter, some make different sounds than others when knocked on, and so forth. The system 500 may determine whether presenting identical characteristics for multiple objects triggers a biometric response that indicates identical characteristics are unexpected or incorrect. Thus, data may be utilized by the system 500 to determine a range within which the characteristics should fall. The system 500 may then randomize within that range, or quasi-randomize, but weight the outcomes so that the actual range follows a bell curve when measured against frequency.

According to some aspects, users may be provided with a method to provide accuracy feedback. For example, a foot-operated switch (or another type of interface) may be used to indicate when the user feels the environment is inaccurate. In a similar manner, facial and/or visual gestures may be utilized. For example, a user may look at an object that is inaccurate and wink three times in succession to indicate the inaccuracy. A visual system may have the advantage of allowing users to easily, and without undue disruption of participation in the environment, identify the object about which the user is making a report.

For example, the accuracy may be determined by the accuracy component 520 based on an average of multiple responses. For example, if the virtual object may be conveyed to the participants 516 at different times, the accuracy component 520 retains each response until a threshold number of responses are received. Over time, as the threshold number is reached, an average of the responses may be utilized to determine if at least a portion of the set of information should be modified by an adjustment manager 522.

In another example, the accuracy component 520 may be configured to determine an accuracy of the response based on a weighting associated with an accuracy of measurement equipment, a quality assigned to the measurement equipment, or respective characteristics of the different participants. The adjustment manager 522 may be configured to take these parameters into consideration when modifications are to be made to at least a portion of the set of information.

According to some aspects, a database (e.g., the memory 502), may be refined based on analysis of the data by the accuracy component 520. In this way, the modification may be conducted in a manner that modifies the texture and/or material composition data to more closely correspond with the texture and/or material composition experience that the participants expect.

Figure 6:
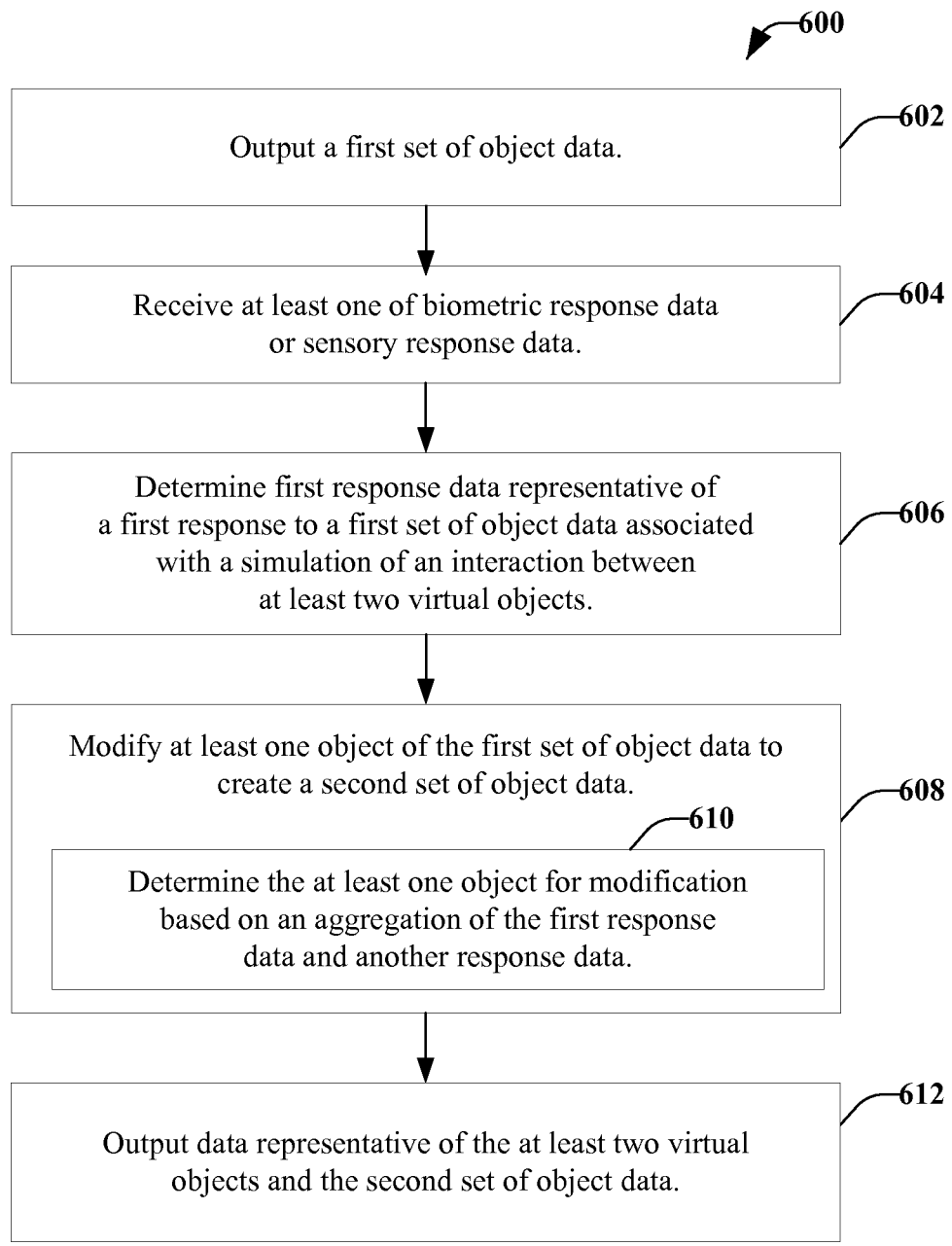
FIG. 6 is a flow diagram illustrating an example, non-limiting embodiment of a method for augmented reality objects based on biometric feedback.

FIG. 6 is a flow diagram illustrating an example, non-limiting embodiment of a method 600 for augmented reality objects based on biometric feedback. The flow diagram in FIG. 6 may be implemented using, for example, any of the systems, such as the system 500 (of FIG. 5), described herein.

Beginning at block 602, output a first set of object data. The first set of object data may include at least one of an object texture data, an object composition data, or an object interaction data. Block 602 may be followed by block 604.

At 604, receive at least one of biometric response data or sensory response data. The biometric response data may be data representative of a biometric response from a biometric measurement device. The sensory response data may be data representative of a sensory response from a sensory measurement device. Block 604 may be followed by block 606.

At block 606, determine first response data representative of a first response to a first set of object data associated with a simulation of an interaction between at least two virtual objects. The first response data may be received in response to an output of the at least two virtual objects and the first set of object data. The first response data may include an indication that the interaction does not match an expected interaction. Further, the first response data may be measured directly and/or may be received from one or more biometric measurement devices and/or one or more sensory measurement devices. Block 606 may be followed by block 608.

At block 608, modify at least one object of the first set of object data to create a second set of object data. The second set of object data may be associated with another simulation of an interaction between the at least two virtual objects. Block 608 may include block 610.

At block 610, determine at least one object for modification based on an aggregation of the first response data and another response data representative of the other response. The other response may be received in response to the at least two virtual objects and the first set of object data. The first response data and the other response data may be received from different sources of input. For example, the different sources of input may be different participants that are interacting in a same augmented reality environment, or in different augmented reality environments. Block 608 or block 610 may be followed by block 612.

At block 612, output data representative of the at least two virtual objects and the second set of object data. According to an implementation, a response to the second set of object data produces another modification of at least one second object of the second set of objet data or a linkage between the second set of object data and the interaction.

Figure 7:
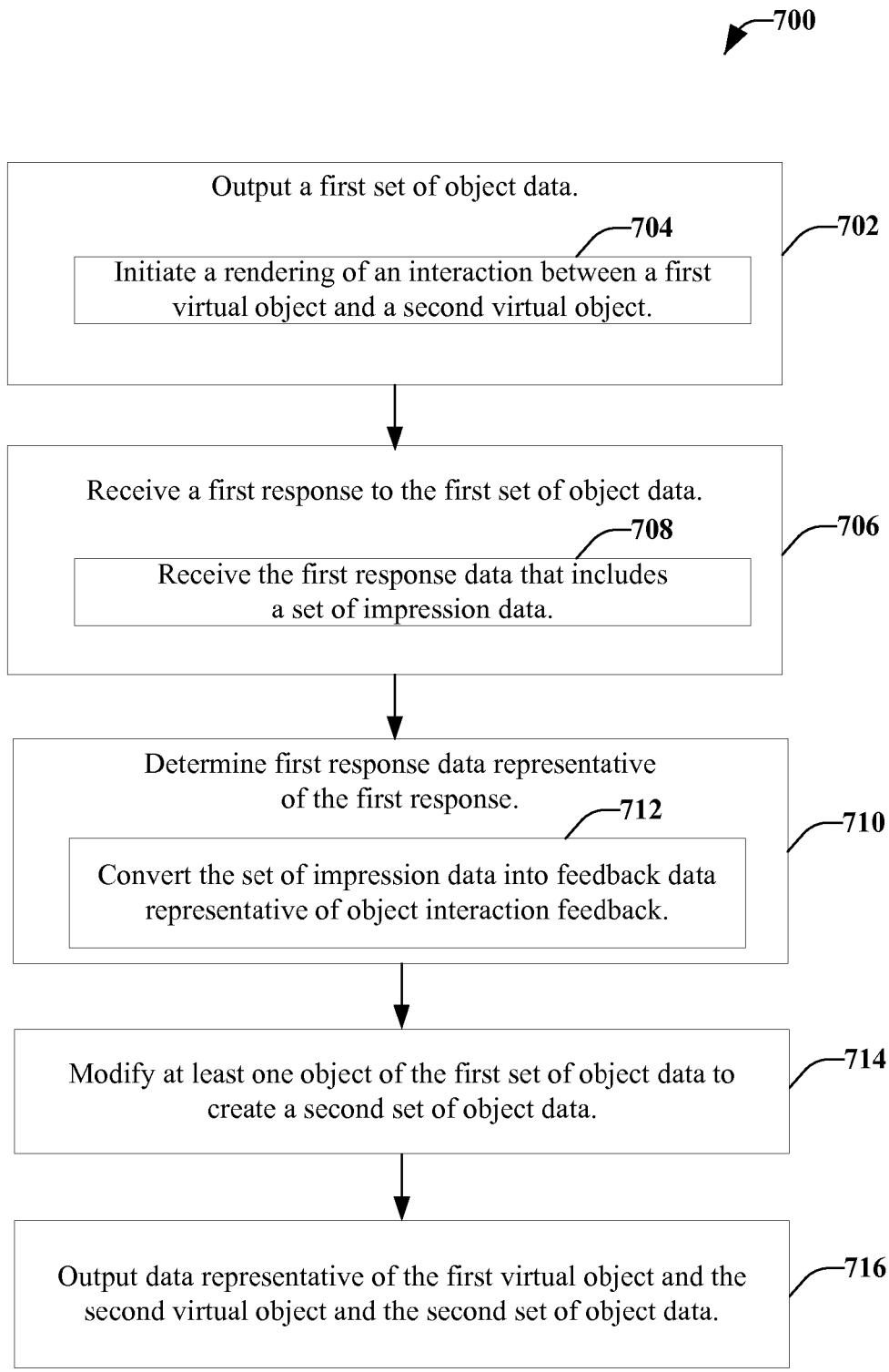
FIG. 7 is a flow diagram illustrating an example, non-limiting embodiment of a method for modifying augmented reality objects based on biometric feedback.

FIG. 7 is a flow diagram illustrating an example, non-limiting embodiment of a method 700 for modifying augmented reality objects based on biometric feedback. The flow diagram in FIG. 7 may be implemented using, for example, any of the systems, such as the system 400 (of FIG. 4), described herein.

Beginning at block 702, output a first set of object data. The first set of object data may be associated with a simulation of an interaction between a first virtual object and a second virtual object (or more virtual objects). The first set of object data may include object interaction data, object texture data, and/or object composition data. According to an implementation, block 702 includes block 704.

At block 704, initiate a rendering of an interaction between the first virtual object and the second virtual object. The interaction may include texture information, material composition information, or texture information and composition information of the first virtual object, the second virtual object, or both the first virtual object and the second virtual object. Block 702 or block 704 may be followed by block 706.

At block 706, receive a first response to the first set of object data. The first response may be received based on biometric responses of one or more participants and/or sensory responses of one or more participants. The biometric responses and/or sensory responses may be measured directly or indirectly through various measurements devices. According to an implementation, block 706 may include block 708.

At block 708, receive the first response data that may include a set of impression data. The impression data may be indicative of the affect or impression the first set of object data has on the user, which may be measured through one or more devices, measurement components, or the like. Block 706 or block 708 may be followed by block 710.

At block 710, determine first response data representative of the first response. In accordance with an implementation, block 710 may include block 712. At block 712, convert the set of impression data into feedback data representative of object interaction feedback. The feedback data may be used to change at least a portion of the first set of object data. Block 710 or block 712 may be followed by block 714.

At block 714, modify at least one object of the first set of object data to create a second set of object data. According to an implementation, block 714 may be followed by block 716.

At block 716, output data representative of the first virtual object and the second virtual object, and the second set of object data. The data output at block 716 may be conveyed to a same participant that received the first set of object data, to a different participant, and/or to multiple participants.

Figure 8:
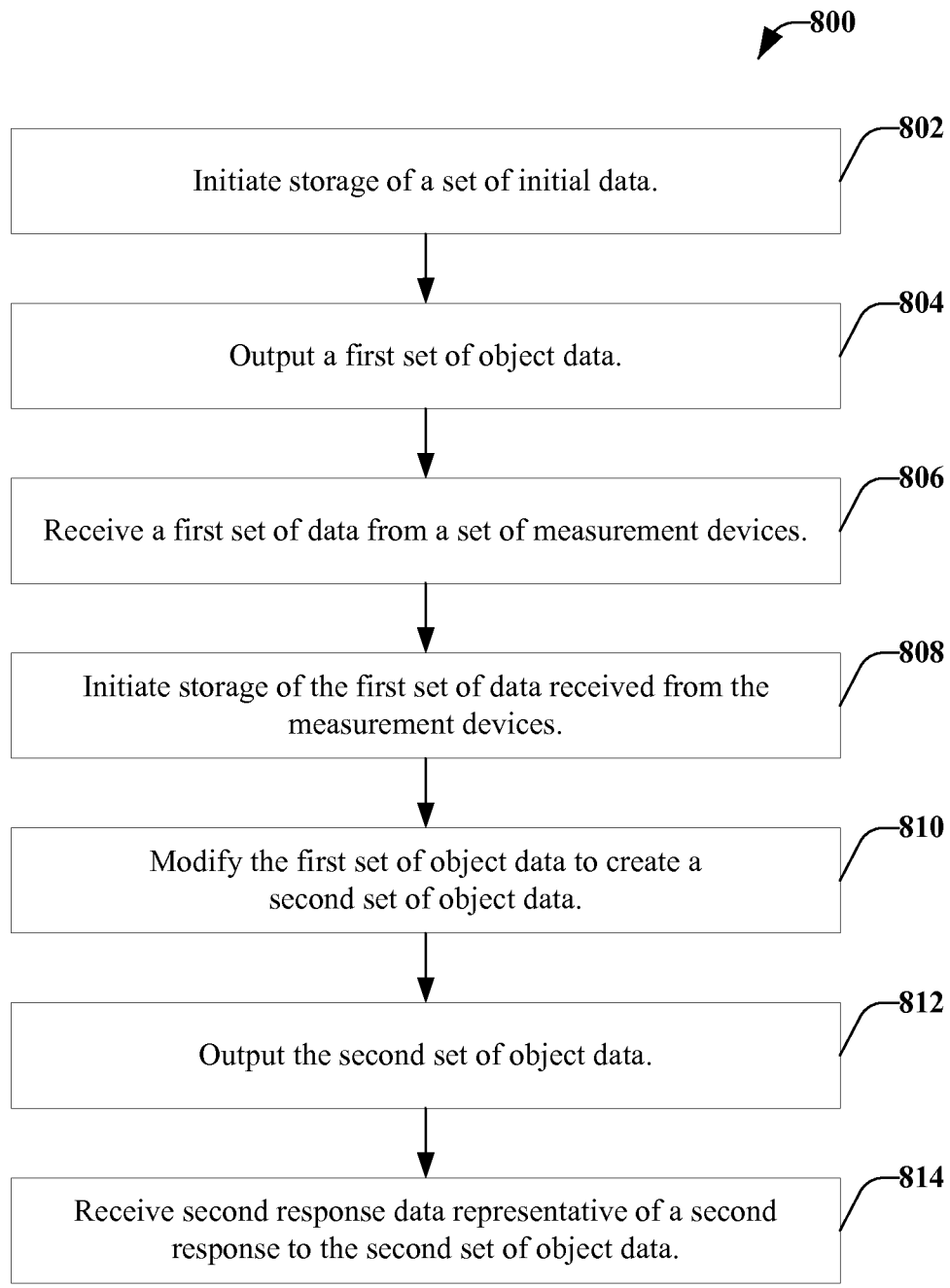
FIG. 8 is a flow diagram illustrating an example, non-limiting embodiment of a method for using participant responses to modify one or more virtual objects in an augmented reality environment.

FIG. 8 is a flow diagram illustrating an example, non-limiting embodiment of a method 800 for using participant responses to modify one or more virtual objects in an augmented reality environment. The flow diagram in FIG. 8 may be implemented using, for example, any of the systems, such as the system 300 (of FIG. 3), described herein.

Beginning at block 802, initiate storage of a set of initial data in a data store. The set of initial data may be information that is associated with a virtual object when the object is created or at a different time. Block 802 may be followed by block 804.

At block 804, output a first set of object data. The first set of object data may include the set of initial data. According to some aspects, the first set of object data includes a portion of the set of initial data. Block 804 may be followed by block 806.

At block 806, receive a first set of data from a set of measurement devices. The measurements devices may be biometric measurement devices, sensory measurement devices, or other devices capable of capturing responses to the output of the first set of object data. Block 806 may be followed by block 808.

At block 808, initiate storage of the set of data received from the set of measurement devices. The set of data may include at least a portion of first response data. According to an aspect, the set of initial data and the set of data are associated with at least one virtual object comprising the first virtual object and the second virtual object. Block 808 may be followed by block 810.

At 810, modify the first set of object data to create a second set of object data. Block 810 may be followed by block 812. At block 812, output the second set of object data. According to an implementation, block 812 may be followed by block 814.

At block 814, receive second response data representative of a second response. The second response may include another indication that the other simulation of the interaction between the first virtual object may be determined to be about the same as the expected interaction.

According to a further implementation, if the second response received indicates that the interaction between the objects is not what was expected, subsequent modifications may be made to the first set of object data and/or the second set of object data.

According to an implementation, a feedback loop may be created based on at least receiving the first set of data, at block 806, outputting the second set of object data at block 812, and receiving the second response, at block 814.

Figure 9:
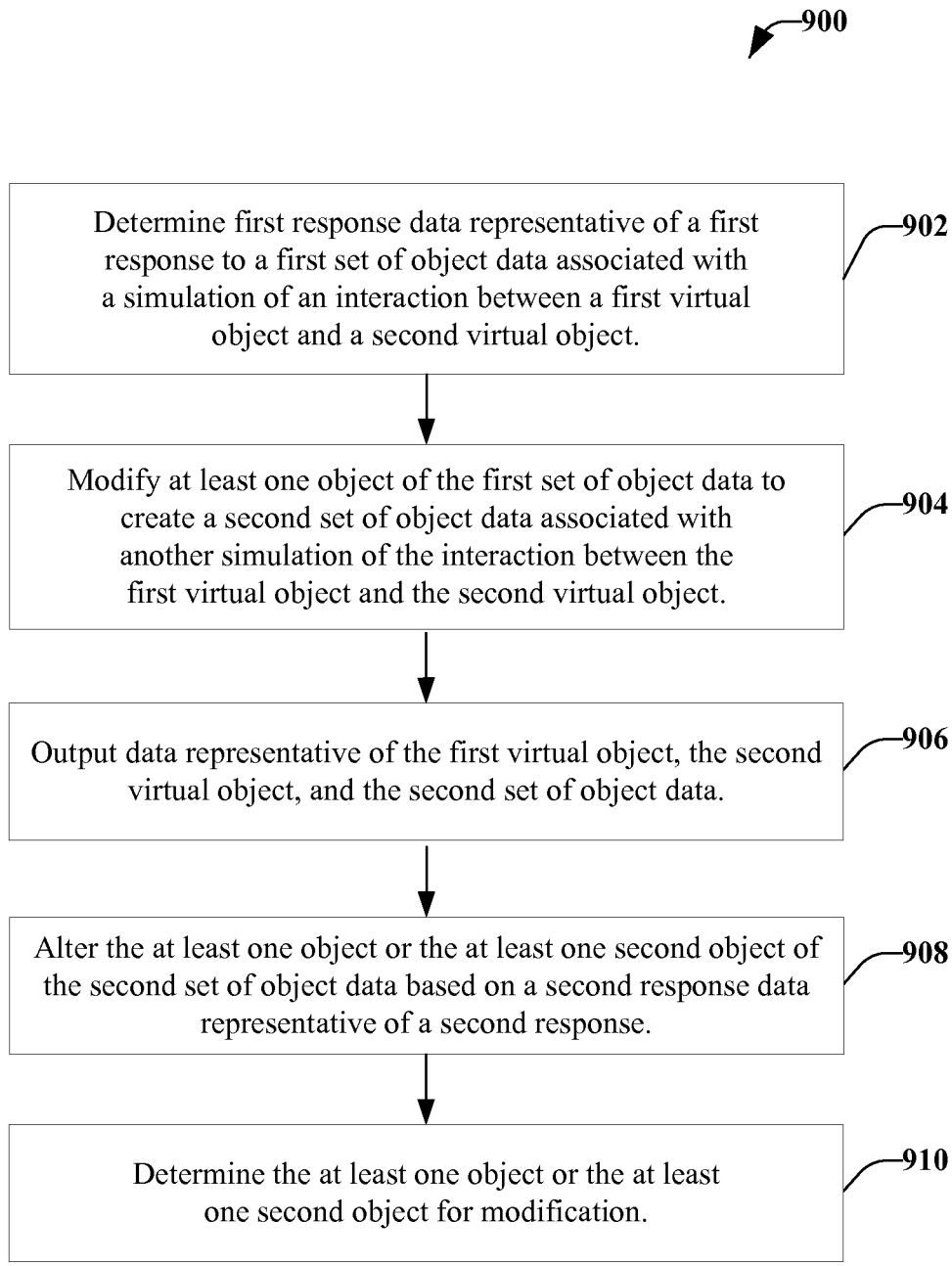
FIG. 9 is a flow diagram illustrating an example, non-limiting embodiment of a method for refining one or more virtual objects in an augmented reality environment.

FIG. 9 is a flow diagram illustrating an example, non-limiting embodiment of a method 900 for refining one or more virtual objects in an augmented reality environment. The flow diagram in FIG. 9 may be implemented using, for example, any of the systems, such as the system 500 (of FIG. 5), described herein.

Beginning at block 902, determine first response data representative of a first response to a first set of object data associated with a simulation of an interaction between a first virtual object and a second virtual object (as well as other virtual objects). The first virtual object and/or the second virtual object may be objects that have a corresponding physical presence in the real world. According to another example, the first virtual object and/or the second virtual object may not have a presence in the real world. For example, these objects may be imaginary or arbitrary.

In an example, the first virtual object may be a crystal glass and the second virtual object may be a hard, wood surface. In another example, the first virtual object may be a car and the second virtual object may be a road. In a further example, the first virtual object may be a human and the second virtual object may be a train whistle. In still another example, the first virtual object may be a flower and the second virtual object may be a fragrance. According to another example, the first virtual object may be a unicorn and the second virtual object may be a tree. Since the first virtual object and the second virtual object (as well as further objects) may be a multitude of different representations, only these few have been discussed for purposes of describing an aspect. It is further noted that the disclosed aspects are not limited to these examples.

According to some implementations, more than one first response is received at block 902. For example, multiple responses may be received from a first participant. Examples of multiple responses include a verbal response, such as an exclamation (e.g., "Oh", "No", and so on) or one or more words or phrases (e.g., "What is that?", "Wrong," and so on). Another response might be a facial expression, such as a surprised look identified by raised eyebrows or opening of a mouth. Other examples include an increased heart rate, excessive perspiration, and so on.

According to some aspects, there may be more than one response from a user, and the responses may indicate inconsistent things. For example, a user's eyes may widen and heart rate increase, indicating excitement or fear, but skin conductance response (also referred to as galvanic skin response) may show a reduction in user anxiety and excitement. In such a situation, the element or elements with which the user was interacting, observing, and/or experiencing at the time may be marked for further research and/or data gathering. Such an approach may also be utilized where responses from two or more users indicate different things and/or where a user has responded inconsistently when presented a plurality of times with similar stimuli.

In another example, one or more responses may be received from a first participant and one or more other responses may be received from at least a second participant. In an example, the responses from a single participant and/or more than one participant may be aggregated. Such aggregation may be used to determine a more common response among a multitude of participants. For example, for imaginary or arbitrary objects, the multiple responses may provide a better indication of whether (or not) the information output matches what most participants would expect, rather than just relying on a single source of information (e.g., a single participant). This is because a single participant might have a response that is not related to the output of the virtual objects. For example, at about the same time a representation of a virtual object is presented to a user, the user might spill coffee on herself. Thus, the response might indicate the virtual object is inaccurate, when the response was not related to the object, but to the spilt coffee. Thus, multiple responses may be utilized to more accurately represent the virtual object(s). This provides fault tolerance, wherein every response does not result in a change and, in some cases, the response may be disregarded.

According to some aspects, the responses may be measured based on the amount of change from a mean or median for each individual. People react to things differently, which might include a variety of different (and surprising) responses. For example, person A might have a 20% increase in heat rate while, for the same event, person B might have a 40% increase in heart rate. Thus, person B experiencing a 20% increase may indicate a lower amount of surprise than person A would experience at the same 20% increase. Block 902 may be followed by block 904.

At block 904, modify at least one object of the first set of object data to create a second set of object data associated with another simulation of the interaction between the first virtual object and the second virtual object (as well as other virtual objects). According to some aspects, both the first set of object data and the second set of object data (as well as subsequent sets of object data) are maintained in a data store. Further, the various responses and/or sets of object data may be categorized based on one or more features associated with participants (e.g., age, gender, nationality, religious beliefs, and so on). Block 904 may be followed by block 906.

At block 906, output data representative of the first virtual object, the second virtual object, and the second set of object data. According to an implementation, data output at block 906 may be output to the same participant(s) from which the first response(s) was received. According to other implementations, the data output at block 906 may be output to different participants than the participants that received the first set of object data. According to a further implementation, the data output at block 906 may be output to both participant(s) that provided the first response(s) and to other participant(s). Block 906 may be followed by block 908.

At block 908, alter the at least one object or the at least one second object of the second set of object data based on second response data representative of a second response. In accordance with an implementation, the second response may indicate a second interaction between the first virtual object, the second virtual object, and the second set of object data matches an expected interaction. Further to this implementation, further modifications are not necessary.

According to other implementations, the second response may indicate that a second interaction between the first virtual object, the second virtual object, and the second set of object data does not match the expected interaction. Further to this implementation, block 908 may be followed by block 910.

At block 910, determine the at least one object or the at least one second object for modification. According to an implementation, the modification may be based on an aggregation of the second response data and third response data representative of a third response received based on another output of the first virtual object, the second virtual object, and the second set of object data. According to an implementation, the second response and the third response may be received from different sources of input. For example, the second response may be received from a first participant and the third response may be received from a second participant.

Figure 10:
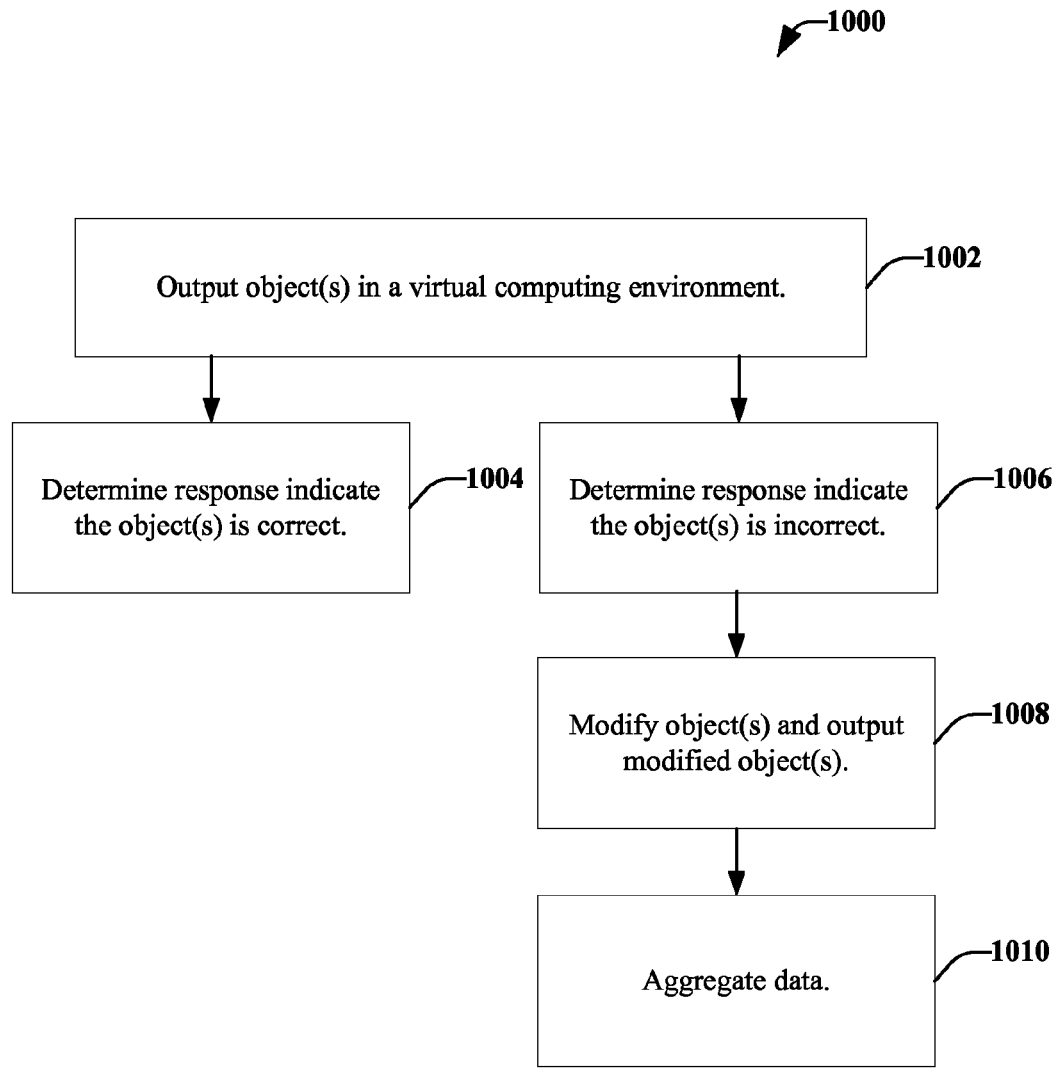
FIG. 10 is a flow diagram illustrating an example, non-limiting embodiment of a method for refining one or more virtual objects in an augmented reality environment.

FIG. 10 is a flow diagram illustrating an example, non-limiting embodiment of a method 1000 for refining one or more virtual objects in an augmented reality environment. The flow diagram in FIG. 10 may be implemented using, for example, any of the systems, such as the system 200 (of FIG. 2), described herein.

Beginning at block 1002, output one or more objects or observation by one or more users in a virtual computing environment. The one or more objects may be output in any perceivable format during a virtual computing experience. According to an aspect, the observation may include coming across an object and tactile interaction occurs. According to another aspect, the observation may include observing an object-to-object interaction. Block 1002 may be followed by block 1004 or block 1006.

At block 1004, determine a response(s) indicates the object is correct. The response may be received from one or more participants. According to an implementation, the response indicates the texture information passed to the user matches the object touched and, further biometric feedback records a correct response from the user. According to another implementation, the response indicates the user observed an object-to-object interaction in which the objects interact correctly with each other and biometric feedback records a correct response from the user.

At block 1006, determine a response(s) indicates the object is incorrect. The response may be received from one or more participants. According to an implementation, the response indicates the texture information passed to the user does not match the object touched and a biometric response indicates an incorrect texture. For example, the response may include dilated pupils, sweating, flushing, heart rate increase, and so on. The response may be recorded by a biometric recording device, according to an example. However, the disclosed aspects are not limited to this implementation. Instead, the response(s) might be transmitted from the biometric measurement device to a processing system, which may process the response and one or more values based on analysis. The processed or analyzed data may be stored (e.g., recorded) in a database or other storage media.

Alternatively or in addition, the response indicates the user observed an object-to-object interaction in which the texture information and material composition of the two or more objects do not interact together correctly. The biometric response indicates error. For example, the response may include dilated pupils, sweating, flushing, heart rate increase, and so on. The response may be recorded by a biometric recording device. Block 1006 may be followed by block 1008.

At block 1008, the one or more objects are modified and the modified object(s) are output. According to an implementation, after the biometric response indicates the incorrect texture was received, an alternative texture may be presented to future users that interact with the same object. The modified object might also be presented to the same user that interacts with the object again. Additional responses and modifications may be made until correct biometric responses are received from the one or more users, or a subset thereof (e.g., at least a threshold number of users indicate the output is correct).

According to another aspect, after the error-indicating biometric response is received, an alternative texture and material composition may be presented as attached to the objects until correct biometric responses are received. The alternative texture and material composition attached to object may be presented to future users or the same user that previously interacted with the object action. Block 1008 may be followed by block 1010.

At block 1010, aggregate data received as biometric responses across a group of people. For example, through a process of trial and error, correct biometric responses may be crowd-sourced (e.g., amalgamation of data) and a database of texture information and/or a database of material composition information may be expended. This may allow for more accurate object and texture recognition and presentation to future users.

Figure 11:
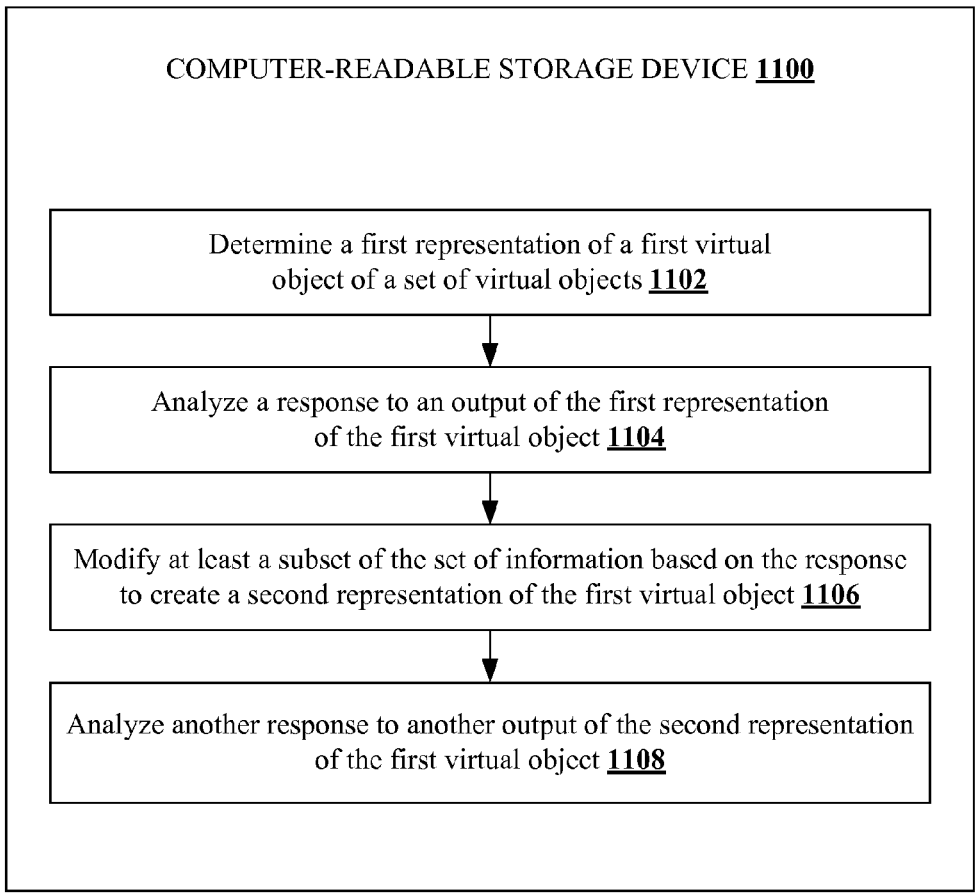
FIG. 11 illustrates a flow diagram of an example, non-limiting embodiment of a set of operations for augmented reality objects based on biometric feedback in accordance with at least some aspects of the subject disclosure.

FIG. 11 illustrates a flow diagram of an example, non-limiting embodiment of a set of operations for augmented reality objects based on biometric feedback in accordance with at least some aspects of the subject disclosure. A computer-readable storage device 1100 may include executable instructions that, in response to execution, cause a system comprising a processor to perform operations.

At 1102, these operations may cause the system to determine a first representation of a first virtual object of a set of virtual objects. The first representation may be based on a set of information that comprises one or more of object type data, object material composition data, object textual data, object temperature data, object visual data, object weight data, object size data, object physics data, or object interaction data. At 1104, the operations may cause the system to analyze a response to an output of the first representation of the first virtual object. The response may include an indication that the first representation of the first virtual object is an incorrect representation. Further, the response may be received from a participant.

At 1106, the operations may cause the system to modify at least a subset of the set of information based on the response to create a second representation, modify elements within the representation, and/or modify sensory characteristics of the representation of the first virtual object.

At 1108, the operations may cause the system to analyze another response to another output of the second representation of the first virtual object. The other response may include another indication that the second representation is a correct representation or is still an incorrect representation In an implementation, the operations may cause the system to combine the response with other responses received in reply to the output of the first representation. The response and the other responses may be received from different participants. Further to this implementation, the operations may cause the system to modify at least the subset of the set of information based on a combination of the response and the other responses.

According to another implementation, the operations may cause the system to convey the first representation to a first participant. Further to this implementation, the operations may cause the system to convey the second representation to the first participant or to a second participant different from the first participant. According to some implementations, the representation of the virtual objects and any modifications to the virtual objects may be based on an inference As discussed herein, various non-limiting embodiments are directed to augmented reality objects based on biometric feedback. The objects might be objects that have a corresponding representation in the real world and/or objects that have no corresponding real-world presence. Further, representations of the virtual objects may be altered based on measurable responses received from one or more participants that perceive the objects, either singularly or in combination (e.g., an interaction between objects). This feedback loops allows for the modification of the objects without the need for manual updates, which conserves time and other resources, while creating a augmented reality experience that is robust and appealing to a multitude of participants.

Example Computing Environment

Figure 12:
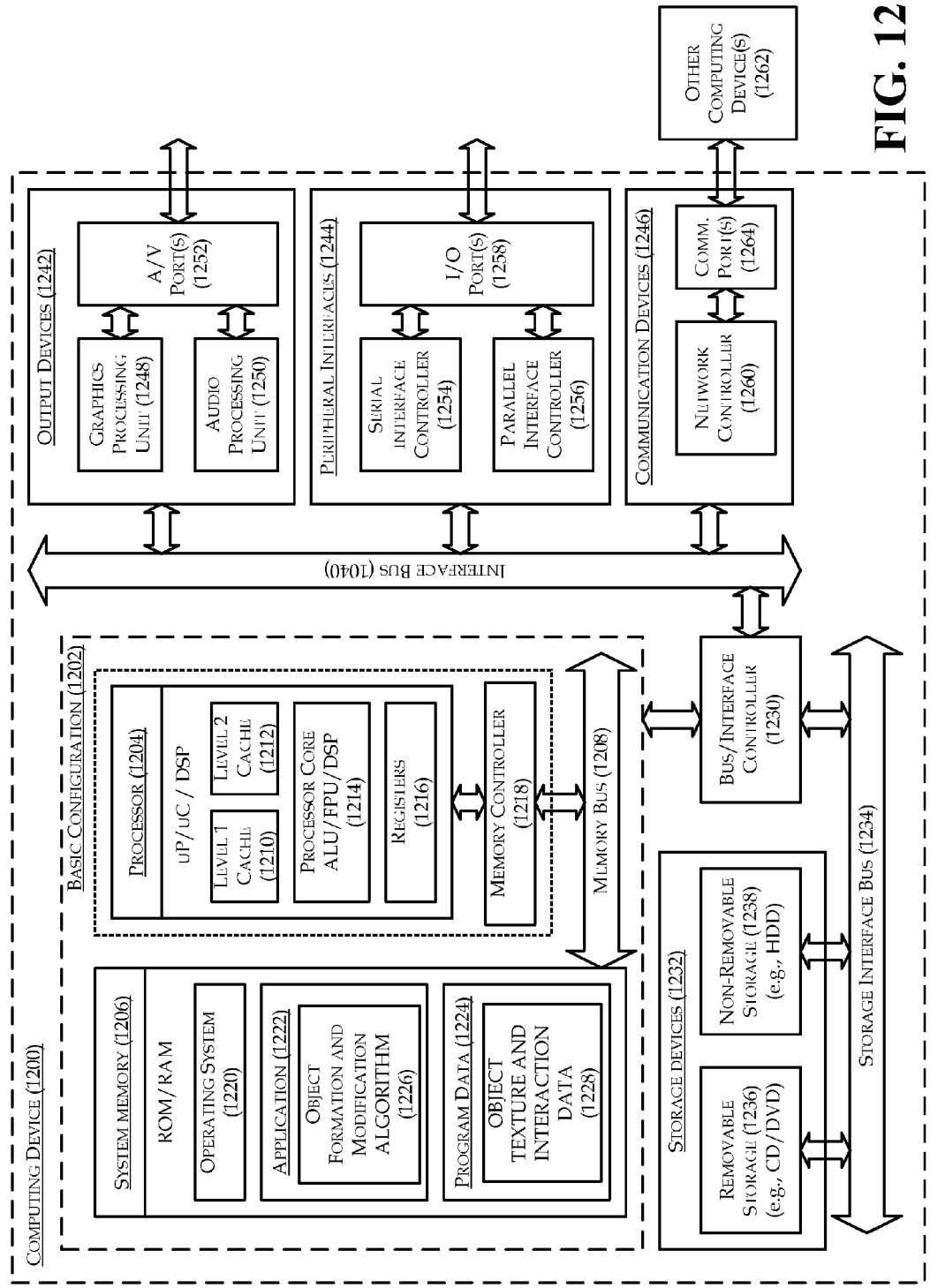
FIG. 12 is a block diagram illustrating an example computing device that is arranged for refinement of augmented reality objects based on biometric feedback in accordance with at least some embodiments of the subject disclosure.

FIG. 12 is a block diagram illustrating an example computing device 1200 that is arranged for refinement of augmented reality objects based on biometric feedback in accordance with at least some embodiments of the subject disclosure. In a very basic configuration 1202, the computing device 1200 typically includes one or more processors 1204 and a system memory 1206. A memory bus 1208 may be used for communicating between the processor 1204 and the system memory 1206.

Depending on the desired configuration, the processor 1204 may be of any type including but not limited to a microprocessor (µP), a microcontroller (µC), a digital signal processor (DSP), or any combination thereof. The processor 1204 may include one more levels of caching, such as a level one cache 1210 and a level two cache 1212, a processor core 1214, and registers 1216. An example processor core 1214 may include an arithmetic logic unit (ALU), a floating point unit (FPU), a digital signal processing core (DSP Core), or any combination thereof. An example memory controller 1218 may also be used with the processor 1204, or in some implementations, the memory controller 1218 may be an internal part of the processor 1204.

In an example, the processor 1204 may execute or facilitate execution of the instructions to perform operations that include determining a first representation of a first virtual object of a set of virtual objects, wherein the first representation is based on a set of information that comprises one or more of object type data, object material composition data, object textual data, object temperature data, object visual data, object weight data, object size data, object physics data, or object interaction data. The operations may also include analyzing a response to an output of the first representation of the first virtual object, wherein the response comprises an indication that the first representation of the first virtual object is an incorrect representation, and the response is received from a participant. The operations may also include modifying at least a subset of the set of information based on the response to create a second representation of the first virtual object. Further, the operations may include analyzing another response to another output of the second representation of the first virtual object, wherein the other response comprises another indication that the second representation is a correct representation or is still the incorrect representation.

According to an implementation, the operations may include combining the response with other responses received in reply to the output of the first representation. The response and the other responses are received from different participants. Further, the operations may include modifying at least the subset of the set of information based on a combination of the response and the other responses.

According to some implementations, the operations may include conveying the first representation to a first participant. Further to this implementation, the operations may include conveying the second representation to the first participant or to a second participant different from the first participant.

Depending on the desired configuration, the system memory 1206 may be of any type including but not limited to volatile memory (such as RAM), non-volatile memory (such as ROM, flash memory, etc.) or any combination thereof. The system memory 1206 may include an operating system 1220, one or more applications 1222, and program data 1224. The applications 1222 may include an object formation and modification algorithm 1226 that is arranged to perform the functions as described herein including those described with respect to the system 400 of FIG. 4. The program data 1224 may include object texture and interaction data 1228 that may be useful for operation with the object formation and modification algorithm 1226 as is described herein. In some embodiments, the applications 1222 may be arranged to operate with the program data 1224 on the operating system 1220 such that a resource management for distributed computing games may be provided. This described basic configuration 1202 is illustrated in FIG. 12 by those components within the inner dashed line.

The computing device 1200 may have additional features or functionality, and additional interfaces to facilitate communications between the basic configuration 1202 and any required devices and interfaces. For example, a bus/interface controller 1230 may be used to facilitate communications between the basic configuration 1202 and one or more data storage devices 1232 via a storage interface bus 1234. The data storage devices 1232 may be removable storage devices 1236, non-removable storage devices 1238, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media may include volatile and nonvolatile, removable and non-removable media implemented in any method or technology for storage of information, such as computer readable instructions, data structures, program modules, or other data.

The system memory 1206, the removable storage devices 1236, and the non-removable storage devices 1238 are examples of computer storage media. Computer storage media includes, but is not limited to, RAM, ROM, EEPROM, flash memory or other memory technology, CD-ROM, digital versatile disks (DVDs) or other optical storage, magnetic cassettes, magnetic tape, magnetic disk storage or other magnetic storage devices, or any other medium which may be used to store the desired information and which may be accessed by the computing device 1200. Any such computer storage media may be part of the computing device 1200.

The computing device 1200 may also include an interface bus 1240 for facilitating communication from various interface devices (e.g., output devices 1242, peripheral interfaces 1244, and communication devices 1246) to basic configuration 1202 via a bus/interface controller 1230. Example output devices 1242 include a graphics processing unit 1248 and an audio processing unit 1250, which may be configured to communicate to various external devices such as a display or speakers via one or more A/V ports 1252. Example peripheral interfaces 1244 may include a serial interface controller 1254 or a parallel interface controller 1256, which may be configured to communicate with external devices such as input devices (e.g., mouse, pen, voice input device, etc.) or other peripheral devices (e.g., printer, scanner, etc.) via one or more I/O ports 1258. An example communication device 1246 includes a network controller 1260, which may be arranged to facilitate communications with one or more other computing devices 1262 over a network communication link via one or more communication ports 1264.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

The subject disclosure is not to be limited in terms of the particular embodiments described in this application, which are intended as illustrations of various aspects. Many modifications and variations may be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The subject disclosure is to be limited only by the terms of the appended claims, along with the full scope of equivalents to which such claims are entitled. It is to be understood that this disclosure is not limited to particular methods, reagents, compounds, compositions or biological systems, which may, of course, vary. It is also to be understood that the terminology used herein is for the purpose of describing particular embodiments only, and is not intended to be limiting.

In an illustrative embodiment, any of the operations, processes, etc. described herein may be implemented as computer-readable instructions stored on a computer-readable medium. The computer-readable instructions may be executed by a processor of a mobile unit, a network element, and/or any other computing device.

There is little distinction left between hardware and software implementations of aspects of systems; the use of hardware or software is generally (but not always, in that in certain contexts the choice between hardware and software may become significant) a design choice representing cost versus efficiency tradeoffs. There are various vehicles by which processes and/or systems and/or other technologies described herein may be effected (e.g., hardware, software, and/or firmware), and that the selected vehicle will vary with the context in which the processes and/or systems and/or other technologies are deployed. For example, if an implementer determines that speed and accuracy are paramount, the implementer may select a mainly hardware and/or firmware vehicle; if flexibility is paramount, the implementer may select a mainly software implementation; or, yet again alternatively, the implementer may select some combination of hardware, software, and/or firmware.

The foregoing detailed description has set forth various embodiments of the devices and/or processes via the use of block diagrams, flowcharts, and/or examples. In so far as such block diagrams, flowcharts, and/or examples contain one or more functions and/or operations, it will be understood by those within the art that each function and/or operation within such block diagrams, flowcharts, or examples may be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, may be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof. Further, designing the circuitry and/or writing the code for the software and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiments of the subject matter described herein applies regardless of the particular type of signal bearing medium used to actually carry out the distribution. Examples of a signal bearing medium include, but are not limited to, the following: a recordable type medium such as a floppy disk, a hard disk drive, a CD, a DVD, a digital tape, a computer memory, etc.; and a transmission type medium such as a digital and/or an analog communication medium (e.g., a fiber optic cable, a waveguide, a wired communications link, a wireless communication link, etc.).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein may be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity; control motors for moving and/or adjusting components and/or quantities). A typical data processing system may be implemented utilizing any suitable commercially available components, such as those typically found in data computing/communication and/or network computing/communication systems.

The herein described subject matter sometimes illustrates different components contained within, or connected with, different other components. It is to be understood that such depicted architectures are merely examples, and that in fact many other architectures may be implemented which achieve a similar functionality. In a conceptual sense, any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermedial components. Likewise, any two components so associated may also be viewed as being "operably connected", or "operably coupled", to each other to achieve the desired functionality, and any two components capable of being so associated may also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art may translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an"

limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range may be easily recognized as sufficiently describing and enabling the same range being broken down into at least equal halves, thirds, quarters, fifths, tenths, etc. As a non-limiting example, each range discussed herein may be readily broken down into a lower third, middle third and upper third, etc. As will also be understood by one skilled in the art all language such as "up to," "at least," and the like include the number recited and refer to ranges which may be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

While the various aspects have been elaborated by various figures and corresponding descriptions, features described in relation to one figure are included in the aspects as shown and described in the other figures. Merely as one example, the "virtual object manager" described in relation to FIG. 5 is also a feature in the aspect as shown in FIG. 2, FIG. 3, FIG. 4, and so forth.

From the foregoing, it will be appreciated that various embodiments of the subject disclosure have been described herein for purposes of illustration, and that various modifications may be made without departing from the scope and spirit of the subject disclosure. Accordingly, the various embodiments disclosed herein are not intended to be limiting, with the true scope and spirit being indicated by the following claims.

What is claimed is:

1. A method for creation and modification of augmented reality objects based on biometric feedback, the method comprising:

determining, by a system comprising a processor and a first measurement device, based on measurement data obtained from the first measurement device, first response data representative of a first response to a first set of object data associated with a simulation of an interaction between a first virtual object and a second virtual object, wherein the first response data comprises an indication that the interaction does not match an expected interaction, wherein the first response data is received in response to an output of the first virtual object, the second virtual object, and the first set of object data, and wherein the indication represents that an object behavior comprised in the first set of object data is not represented as expected in comparison to the expected interaction for a scenario involving the first virtual object and the second virtual object;

determining an accuracy of the first response data, wherein the accuracy of the first response data is determined based on an accuracy of the first measurement device and based on a quality assigned to the first measurement device;

modifying, based on the first response data and the determined accuracy of the first response data, at least one object of the first set of object data to create a second set of object data associated with another simulation of the interaction between the first virtual object and the second virtual object; and outputting data representative of the first virtual object, the second virtual object, and the second set of object data, wherein a second response to the second set of object data produces a modification of at least one second object of the second set of object data or a linkage between the second set of object data and the interaction, wherein the determining the first response data, the accuracy, and the second response enables the system to modify one or more objects automatically, thereby conserving time and one or more other resources of the system in creation of the augmented reality objects, and wherein the output includes one of display, audio, or olfactory.

2. The method of claim 1, wherein the modifying further comprises:

determining the at least one object for modification based on an aggregation of the first response data and third response data, wherein the third response data is representative of a third response received in response to the data representative of the first virtual object, the second virtual object, and the first set of object data, and wherein the first response data and the third response data are received from different sources of input.

3. The method of claim 1, further comprising:

receiving a second response data representative of the second response that comprises another indication that the another simulation of the interaction between the first virtual object and the second virtual object is determined to be within a determined amount of deviation from the expected interaction.

4. The method of claim 1, further comprising:
outputting the first set of object data that comprises at least one of an object texture data, an object composition data, or an object interaction data.

5. The method of claim 1, further comprising:
altering the at least one object of the first set of object data or the at least one second object of the second set of object data based on a second response data representative of the second response that indicates a second interaction between the first virtual object, the second virtual object, and the second set of object data does not match the expected interaction.

6. The method of claim 5, further comprising:
determining the at least one object of the first set of object data or the at least one second object for modification based on an aggregation of the second response data and third response data, wherein the third response data is representative of a third response received based on another output of the first virtual object, the second virtual object, and the second set of object data, and wherein the second response and the third response are received from different sources of input.

7. The method of claim 1, wherein the determining comprises:
receiving at least one of biometric response data as the first response, wherein the biometric response data is representative of a biometric response from a biometric measurement device or a sensory response data as the first response, and wherein the sensory response data is representative of a sensory response from a sensory measurement device.

8. The method of claim 1, further comprising:
receiving the first response data that comprises a set of impression data; and
converting the set of impression data into feedback data representative of object interaction feedback, wherein the second set of object data is selected based on the feedback data.

9. The method of claim 1, wherein the outputting comprises:
initiating a rendering of the interaction between the first virtual object and the second virtual object, wherein the interaction comprises texture information, material composition information, or texture information and material composition information of the first virtual object, the second virtual object, or the first virtual object and the second virtual object.

10. The method of claim 1, wherein the first set of object data comprises an object interaction data, an object texture data, and an object composition data.

11. The method of claim 1, further comprising:
initiating storage of a set of initial data in a data store, wherein the first set of object data comprises the set of initial data; and
initiating storage of a set of data received from a set of measurement devices as at least a portion of the first response data, wherein the set of initial data and the set of data are associated with at least one virtual object comprising the first virtual object and the second virtual object.

12. The method of claim 1, wherein the first response to the output is based on an interaction between the first virtual object and a user that perceives the first virtual object through interaction with a force feedback device.

13. A system to create and modify augmented reality objects based on biometric feedback, the system comprising:
a memory that stores computer-executable components; and
a processor, coupled to the memory, operable to execute or facilitate execution of one or more of the computer-executable components, wherein the computer-executable components are executable to perform operations to:
determine at least one first representation of at least one virtual object of a set of virtual objects, wherein the at least one first representation is based on a set of information that comprises one or more of object type data, object material composition data, object textual data, object temperature data, object visual data, object weight data, object size data, object physics data, or object interaction data;
detect, via a biometric measurement device or via a sensory measurement device, a response to an output of the at least one first representation of the at least one virtual object, wherein the response comprises an indication that the at least one first representation of the at least one virtual object is an unexpected representation, and wherein the unexpected representation is associated with the at least one virtual object behaving in a manner that does not match a user's expectation for a scenario involving the at least one virtual object, wherein the output includes one of display, audio, or olfactory;
determine an accuracy of the response, wherein the accuracy of the response is determined based on an accuracy of the biometric measurement device or the sensory measurement device and based on a quality assigned to the biometric measurement device or the sensory measurement device;
modify, based on the response and based on the determined accuracy of the response, at least a portion of the set of information; and
create at least a second representation of the at least one virtual object, wherein the detection of the response and the determination of the accuracy enable the system to modify one or more objects automatically, thereby conserving time and one or more other resources of the system in creation of the augmented reality objects.

14. The system of claim 13, wherein the operations further comprise operations to:
convey the at least one first representation to a first participant, and at least one second representation to a second participant, wherein the second participant is different from the first participant, and wherein the operations to detect the response further comprise operations to detect another response to the at least one second representation received from the second participant.

15. The system of claim 14, wherein operations to convey the at least one first representation and the at least one second representation comprises operations to convey the at least one first representation and the at least one second representation as at least one of a tactile representation, an auditory representation, a visual representation, or a behavioral representation.

16. The system of claim 13, wherein the operations further comprise operations to:
combine the response with other responses received in reply to the output of the at least one first representation, wherein the response and the other responses are received from different participants, and wherein the modifying further comprises modifying at least the portion based on a combination of the response and the other responses.

17. The system of claim 16, wherein the operations to determine the accuracy of the response further comprise operations to:
determine the accuracy of the response based on an average of the response and the other responses, or based on at least one of a weighting associated with an accuracy of measurement equipment, a quality assigned to the measurement equipment, or respective characteristics of the different participants.

18. The system of claim 13, wherein operations to detect the response further comprise operations to receive a biometric response from the biometric measurement device or to receive a sensory response from the sensory measurement device.

19. The system of claim 13, wherein, based on a determination that the at least one virtual object corresponds to a real world object, the determination of the at least one first representation of the at least one virtual object comprises simulation of the real world object.

20. The system of claim 13, wherein, based on a determination that the at least one virtual object does not correspond to a real world object, the determination of the at least one first representation of the at least one virtual object does not comprise simulation of the real world object.

21. A non-transitory computer-readable storage device comprising executable instructions that, in response to execution, cause a system comprising a processor and a measurement device to perform operations, comprising:
obtaining a set of information from the measurement device and transmitting the set of information to the processor;
determining a first representation of a first virtual object of a set of virtual objects, wherein the first representation is based on the set of information that comprises one or more of object type data, object material composition data, object textual data, object temperature data, object visual data, object weight data, object size data, object physics data, or object interaction data;
analyzing a response to an output of the first representation of the first virtual object, wherein the response comprises an indication that the first representation of the first virtual object is an unexpected representation, wherein the response is received from a participant via the measurement device, and wherein the output includes one of display, audio, or olfactory;
determining an accuracy of the response, wherein the accuracy of the response is determined based on an accuracy of the measurement device and based on a quality assigned to the first measurement device;
modifying, based on the response and based on the determined accuracy of the response, at least a subset of the set of information to create a second representation of the first virtual object; and
analyzing another response to another output of the second representation of the first virtual object, wherein the another response is measured via another measurement device or the measurement device, and wherein the another response comprises another indication that the second representation is an expected representation or is still the unexpected representation, and wherein the analysis of the response, the determination of the accuracy, and the analysis of the another response enables the system to modify one or more objects automatically, thereby conserving time and resources in creation of augmented reality objects.

22. The non-transitory computer-readable storage device of claim 21, wherein the operations further comprise:
combining the response with other responses received in reply to the output of the first representation, wherein the response and the other responses are received from different participants, and wherein the modifying at least the subset of the set of information is based on a combination of the response and the other responses.

23. The non-transitory computer-readable storage device of claim 21, wherein the operations further comprise:
conveying the first representation to a first participant; and
conveying the second representation to the first participant or to a second participant wherein the second participant is different from the first participant.

* * * * *